(12) United States Patent
Poddar et al.

(10) Patent No.: US 10,403,024 B2
(45) Date of Patent: Sep. 3, 2019

(54) OPTIMIZING FOR RENDERING WITH CLEAR COLOR

(71) Applicant: Intel Corporation, Santa Clara, CA (US)

(72) Inventors: Bimal Poddar, El Dorado Hills, CA (US); Prasoonkumar Surti, Folsom, CA (US); Rahul P. Sathe, Emeryville, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/988,157

(22) Filed: May 24, 2018

(65) Prior Publication Data
US 2018/0268597 A1 Sep. 20, 2018

Related U.S. Application Data

(63) Continuation of application No. 14/737,302, filed on Jun. 11, 2015, now Pat. No. 9,984,490.

(51) Int. Cl.
| G06T 15/00 | (2011.01) |
| G06T 1/60 | (2006.01) |
| G06T 15/04 | (2011.01) |
| G06T 15/50 | (2011.01) |
| G06T 19/20 | (2011.01) |

(52) U.S. Cl.
CPC .............. *G06T 15/005* (2013.01); *G06T 1/60* (2013.01); *G06T 15/04* (2013.01); *G06T 15/506* (2013.01); *G06T 19/20* (2013.01); *G06T 2200/04* (2013.01); *G06T 2200/28* (2013.01); *G06T 2210/62* (2013.01)

(58) Field of Classification Search
CPC ..... G06T 15/005; G06T 15/04; G06T 15/506; G06T 1/60; G06T 19/20; G06T 2200/04; G06T 2200/28; G06T 2210/62
See application file for complete search history.

(56) References Cited

U.S. PATENT DOCUMENTS

| 6,337,690 | B1 | 1/2002 | Ashburn et al. |
| 6,864,895 | B1* | 3/2005 | Tidwell .................... G06T 1/60 345/522 |
| 6,911,990 | B2 | 6/2005 | Selig et al. |
| 6,982,713 | B2 | 1/2006 | Shao et al. |
| 7,830,397 | B2 | 11/2010 | Surti et al. |
| 8,194,088 | B1* | 6/2012 | Paquette ................. G06T 11/40 345/545 |

(Continued)

OTHER PUBLICATIONS

International Search Report and Written Opinion received for PCT Patent Application No. PCT/US2016/028455, dated Jul. 29, 2016, 12 pages.

(Continued)

*Primary Examiner* — King Y Poon
*Assistant Examiner* — Vincent Peren
(74) *Attorney, Agent, or Firm* — Womble Bond Dickinson (US) LLP

(57) ABSTRACT

Embodiments provide for a graphics processing apparatus comprising render logic to detect rendering operations that will result in framebuffer having the same data as the initial clear color value and morphing such rendering operations to optimizations that are typically done for initial clearing of the framebuffer.

20 Claims, 20 Drawing Sheets

(56) References Cited

U.S. PATENT DOCUMENTS

| | | | |
|---|---|---|---|
| 8,547,382 B2 | 10/2013 | Kallio | |
| 2004/0017377 A1* | 1/2004 | Butcher | G09G 5/024 345/589 |
| 2011/0243469 A1* | 10/2011 | McAllister | G06T 9/00 382/239 |
| 2013/0002689 A1* | 1/2013 | Panneer | G06T 1/20 345/506 |
| 2014/0111512 A1 | 4/2014 | Huang | |
| 2015/0029203 A1 | 1/2015 | Surti | |

OTHER PUBLICATIONS

International Preliminary Report on Patentability received for PCT Patent Application No. PCT/US2016/028455, dated Dec. 21, 2017, 11 pages.

\* cited by examiner

OPTIMIZING FOR RENDERING WITH CLEAR COLOR

RELATED APPLICATION

The present application is a continuation of and claims the benefit of U.S. patent application Ser. No. 14/737,302 filed on Jun. 22, 2015 and entitled "OPTIMIZING FOR RENDERING WITH CLEAR COLOR", and which is incorporated by reference in its entirety.

TECHNICAL FIELD

Embodiments generally relate to graphics processing hardware. More particularly, embodiments relate to graphics processing hardware to perform three dimensional graphics operations.

BACKGROUND

Three-dimension (3D) graphics applications generate image frames by combining input textures, lighting model and physics model. The image generation is intensive in both the number of computes required to do the lighting and physics but also in the number of memory operations for fetching the input textures and writing out processed pixels. Since the performance and power consumption is typically dependent on the number of memory operations, graphics hardware implementations optimize to reduce the number of memory operations. One of common 3D graphics operations that is optimized is the operation of clearing the framebuffer since applications typically start any rendering operation sequence by starting with a clear framebuffer.

The clear operation can be very time consuming and wasteful of system resource such as memory operations since the clear operation is expected to touch every pixel in the framebuffer. Graphics processor implementations can optimize the clear operation by delaying the activity of touching any pixel by tracking what pixels have been over-written. If a cleared pixel is overwritten, then the pixel starts with the overwritten value and the clear operation for the pixel is suppressed. However, if a pixel is not-overwritten and has a clear color value, such a pixel when used for subsequent operations can continue to further provide for reduced number of memory operations. If such a clear pixel is to be displayed, instead of fetching the data from the framebuffer, the clear color value can be substituted for such pixels by the display hardware. In essence, optimizing for clear color has benefit of reduced memory operation not just for the initial clear but any subsequent operations that reference such a pixel. However, known hardware solutions optimize only when the framebuffer is explicitly cleared by the application by making an explicit request to clear to the framebuffer.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

State of the art implementations provide for graphics hardware having end-to-end clear color optimizations that not only suppresses clear writes but also optimize the fetching of cleared regions when used for subsequent sampler and/or display hardware that need to fetch the cleared regions. In such implementations, the framebuffer, when it is cleared through a clear command, is tracked to be in a "CLEAR" state. When the framebuffer data is subsequently over-written by 3D primitives, the framebuffer data is no longer considered CLEAR. However, even when the data is over-written with 3D primitives, there are use cases where the 3D primitives may overwrite the framebuffer with clear color value.

The end-to-end clear color optimization provided by embodiments described herein provides clear color rendering optimizations both while rendering a frame buffer with 3D primitive command with clear color, as well as during the subsequent usage of the framebuffer. Additionally, the optimization additionally benefits rendering to a multiple render buffers as part of deferred shading.

For the purposes of explanation, numerous specific details are set forth to provide a thorough understanding of the various embodiments described below. However, it will be apparent to a skilled practitioner in the art that the embodiments may be practiced without some of these specific details. In other instances, well-known structures and devices are shown in block diagram form to avoid obscuring the underlying principles, and to provide a more thorough understanding of embodiments. Although some of the following embodiments are described with reference to a graphics processor, similar techniques and teachings may be applied to other types of circuits or semiconductor devices.

In the description that follows, FIGS. 1-12 provide an overview of exemplary data processing system and graphics processor logic that incorporates or relates to the various embodiments. FIGS. 13-16 provide specific details of the various embodiments.

System Overview

Figure 1:
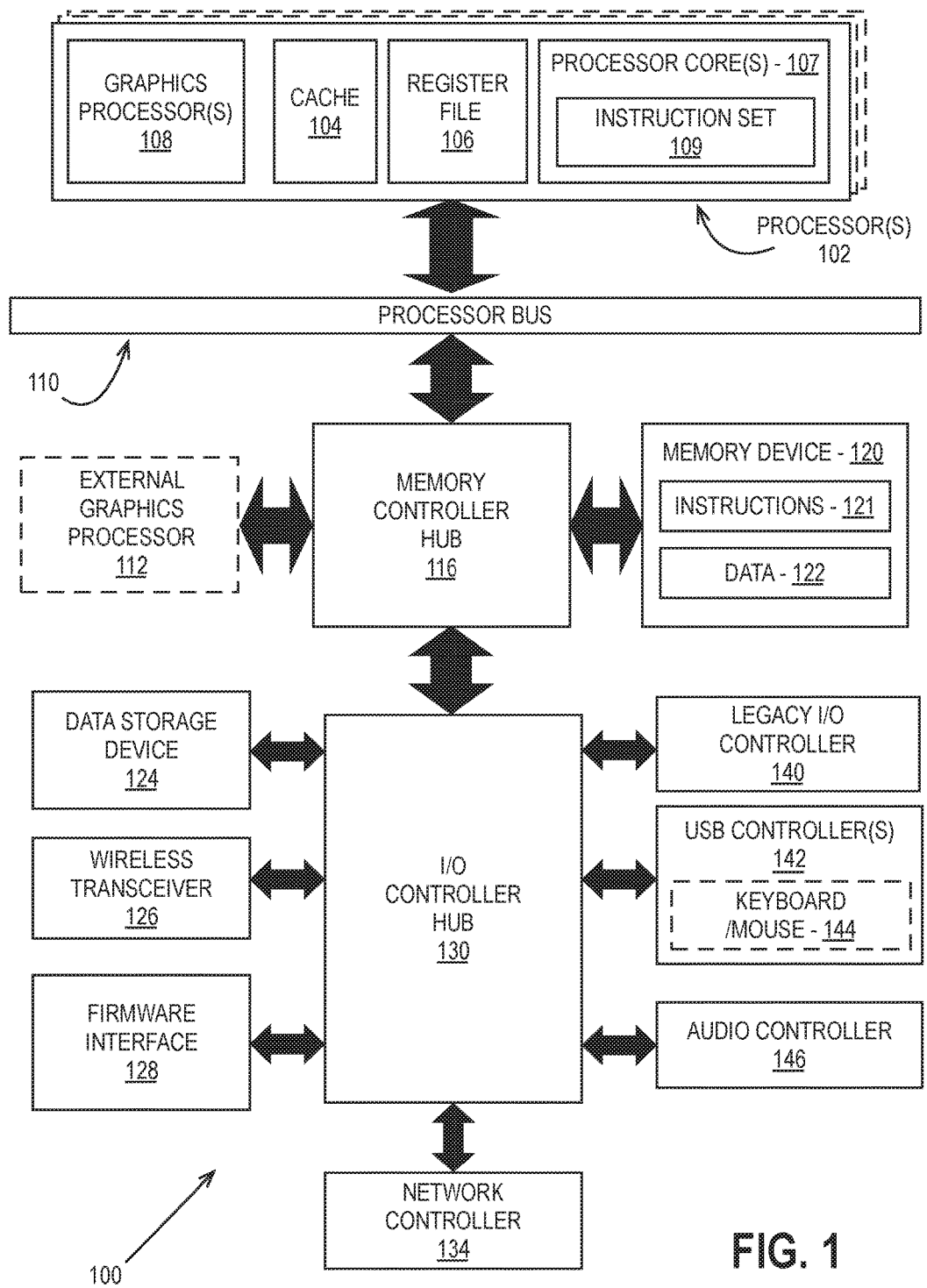
FIG. 1 is a block diagram of an embodiment of a computer system with a processor having one or more processor cores and graphics processors.

FIG. 1 is a block diagram of a processing system 100, according to an embodiment. In various embodiments the system 100 includes one or more processors 102 and one or more graphics processors 108, and may be a single processor desktop system, a multiprocessor workstation system, or a server system having a large number of processors 102 or processor cores 107. In on embodiment, the system 100 is a processing platform incorporated within a system-on-a-chip (SoC) integrated circuit for use in mobile, handheld, or embedded devices.

An embodiment of system 100 can include, or be incorporated within a server-based gaming platform, a game console, including a game and media console, a mobile gaming console, a handheld game console, or an online game console. In some embodiments system 100 is a mobile phone, smart phone, tablet computing device or mobile Internet device. Data processing system 100 can also include, couple with, or be integrated within a wearable device, such as a smart watch wearable device, smart eyewear device, augmented reality device, or virtual reality device. In some embodiments, data processing system 100 is a television or set top box device having one or more processors 102 and a graphical interface generated by one or more graphics processors 108.

In some embodiments, the one or more processors 102 each include one or more processor cores 107 to process instructions which, when executed, perform operations for system and user software. In some embodiments, each of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). Multiple processor cores 107 may each process a different instruction set 109, which may include instructions to facilitate the emulation of other instruction sets. Processor core 107 may also include other processing devices, such a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 is additionally included in processor 102 which may include different types of registers for storing different types of data (e.g., integer registers, floating point registers, status registers, and an instruction pointer register). Some registers may be general-purpose registers, while other registers may be specific to the design of the processor 102.

In some embodiments, processor 102 is coupled to a processor bus 110 to transmit communication signals such as address, data, or control signals between processor 102 and other components in system 100. In one embodiment the system 100 uses an exemplary 'hub' system architecture, including a memory controller hub 116 and an Input Output (I/O) controller hub 130. A memory controller hub 116 facilitates communication between a memory device and other components of system 100, while an I/O Controller Hub (ICH) 130 provides connections to I/O devices via a local I/O bus. In one embodiment, the logic of the memory controller hub 116 is integrated within the processor.

Memory device 120 can be a dynamic random access memory (DRAM) device, a static random access memory (SRAM) device, flash memory device, phase-change memory device, or some other memory device having suitable performance to serve as process memory. In one embodiment the memory device 120 can operate as system memory for the system 100, to store data 122 and instructions 121 for use when the one or more processors 102 executes an application or process. Memory controller hub 116 also couples with an optional external graphics processor 112, which may communicate with the one or more graphics processors 108 in processors 102 to perform graphics and media operations.

In some embodiments, ICH 130 enables peripherals to connect to memory device 120 and processor 102 via a high-speed I/O bus. The I/O peripherals include, but are not limited to, an audio controller 146, a firmware interface 128, a wireless transceiver 126 (e.g., Wi-Fi, Bluetooth), a data storage device 124 (e.g., hard disk drive, flash memory, etc.), and a legacy I/O controller 140 for coupling legacy (e.g., Personal System 2 (PS/2)) devices to the system. One or more Universal Serial Bus (USB) controllers 142 connect input devices, such as keyboard and mouse 144 combinations. A network controller 134 may also couple to ICH 130. In some embodiments, a high-performance network controller (not shown) couples to processor bus 110. It will be appreciated that the system 100 shown is exemplary and not limiting, as other types of data processing systems that are differently configured may also be used. For example, the I/O controller hub 130 may be integrated within the one or more processor 102, or the memory controller hub 116 and I/O controller hub 130 may be integrated into a discreet external graphics processor, such as the external graphics processor 112.

Figure 2:
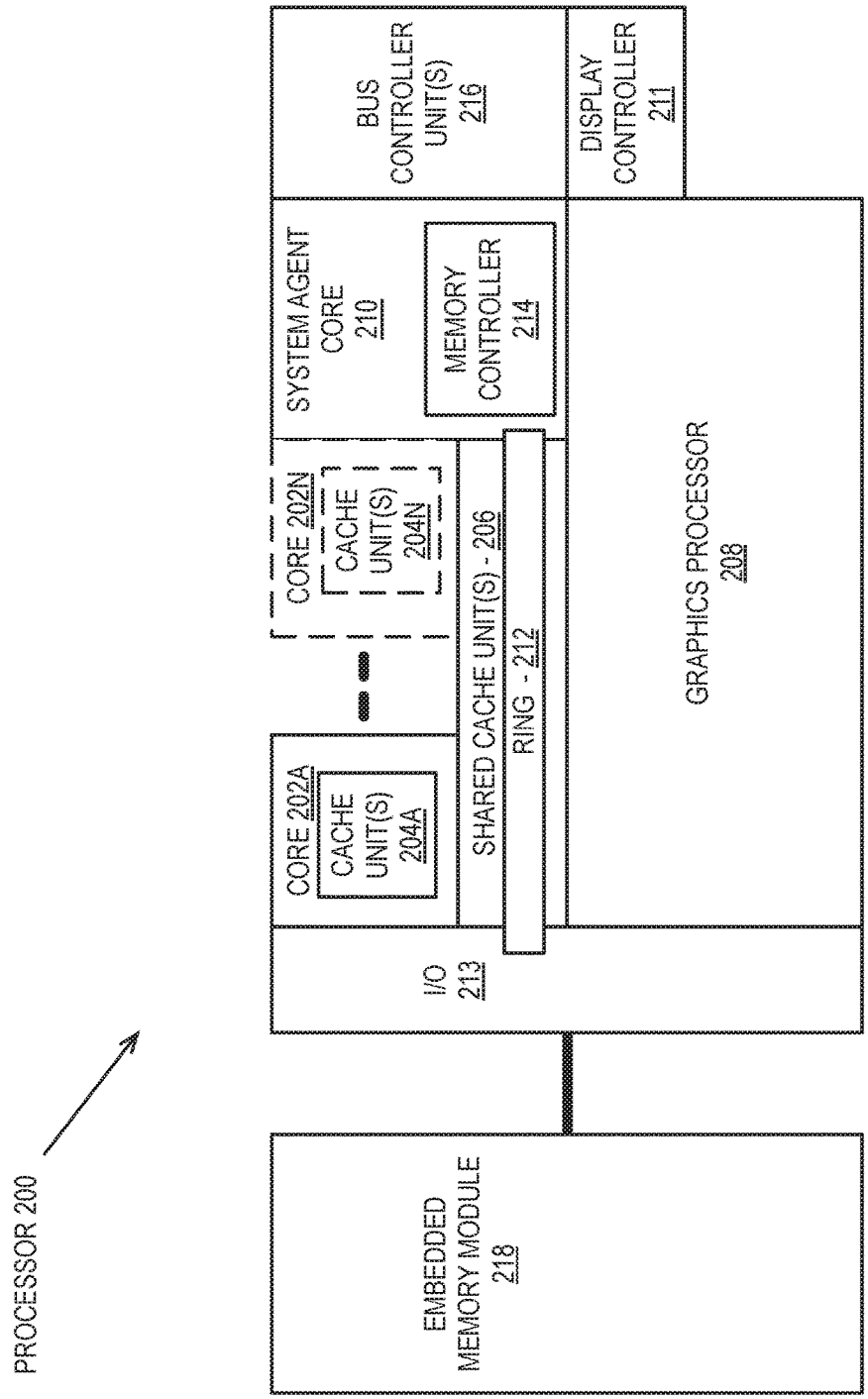
FIG. 2 is a block diagram of one embodiment of a processor having one or more processor cores, an integrated memory controller, and an integrated graphics processor.

FIG. 2 is a block diagram of an embodiment of a processor 200 having one or more processor cores 202A-202N, an integrated memory controller 214, and an integrated graphics processor 208. Those elements of FIG. 2 having the same reference numbers (or names) as the elements of any other figure herein can operate or function in any manner similar to that described elsewhere herein, but are not limited to such. Processor 200 can include additional cores up to and including additional core 202N represented by the dashed lined boxes. Each of processor cores 202A-202N includes one or more internal cache units 204A-204N. In some embodiments each processor core also has access to one or more shared cached units 206.

The internal cache units 204A-204N and shared cache units 206 represent a cache memory hierarchy within the processor 200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-204N.

In some embodiments, processor 200 may also include a set of one or more bus controller units 216 and a system agent core 210. The one or more bus controller units 216 manage a set of peripheral buses, such as one or more Peripheral Component Interconnect buses (e.g., PCI, PCI Express). System agent core 210 provides management functionality for the various processor components. In some embodiments, system agent core 210 includes one or more integrated memory controllers 214 to manage access to various external memory devices (not shown).

In some embodiments, one or more of the processor cores 202A-202N include support for simultaneous multi-threading. In such embodiment, the system agent core 210 includes components for coordinating and operating cores 202A-202N during multi-threaded processing. System agent core 210 may additionally include a power control unit (PCU), which includes logic and components to regulate the power state of processor cores 202A-202N and graphics processor 208.

In some embodiments, processor 200 additionally includes graphics processor 208 to execute graphics processing operations. In some embodiments, the graphics processor 208 couples with the set of shared cache units 206, and the system agent core 210, including the one or more integrated memory controllers 214. In some embodiments, a display controller 211 is coupled with the graphics processor 208 to drive graphics processor output to one or more coupled displays. In some embodiments, display controller 211 may be a separate module coupled with the graphics processor via at least one interconnect, or may be integrated within the graphics processor 208 or system agent core 210.

In some embodiments, a ring based interconnect unit 212 is used to couple the internal components of the processor 200. However, an alternative interconnect unit may be used, such as a point-to-point interconnect, a switched interconnect, or other techniques, including techniques well known in the art. In some embodiments, graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In some embodiments, each of the processor cores 202-202N and graphics processor 208 use embedded memory modules 218 as a shared Last Level Cache.

In some embodiments, processor cores 202A-202N are homogenous cores executing the same instruction set architecture. In another embodiment, processor cores 202A-202N are heterogeneous in terms of instruction set architecture (ISA), where one or more of processor cores 202A-N execute a first instruction set, while at least one of the other cores executes a subset of the first instruction set or a different instruction set. In one embodiment processor cores 202A-202N are heterogeneous in terms of microarchitecture, where one or more cores having a relatively higher power consumption couple with one or more power cores having a lower power consumption. Additionally, processor 200 can be implemented on one or more chips or as an SoC integrated circuit having the illustrated components, in addition to other components.

Figure 3:
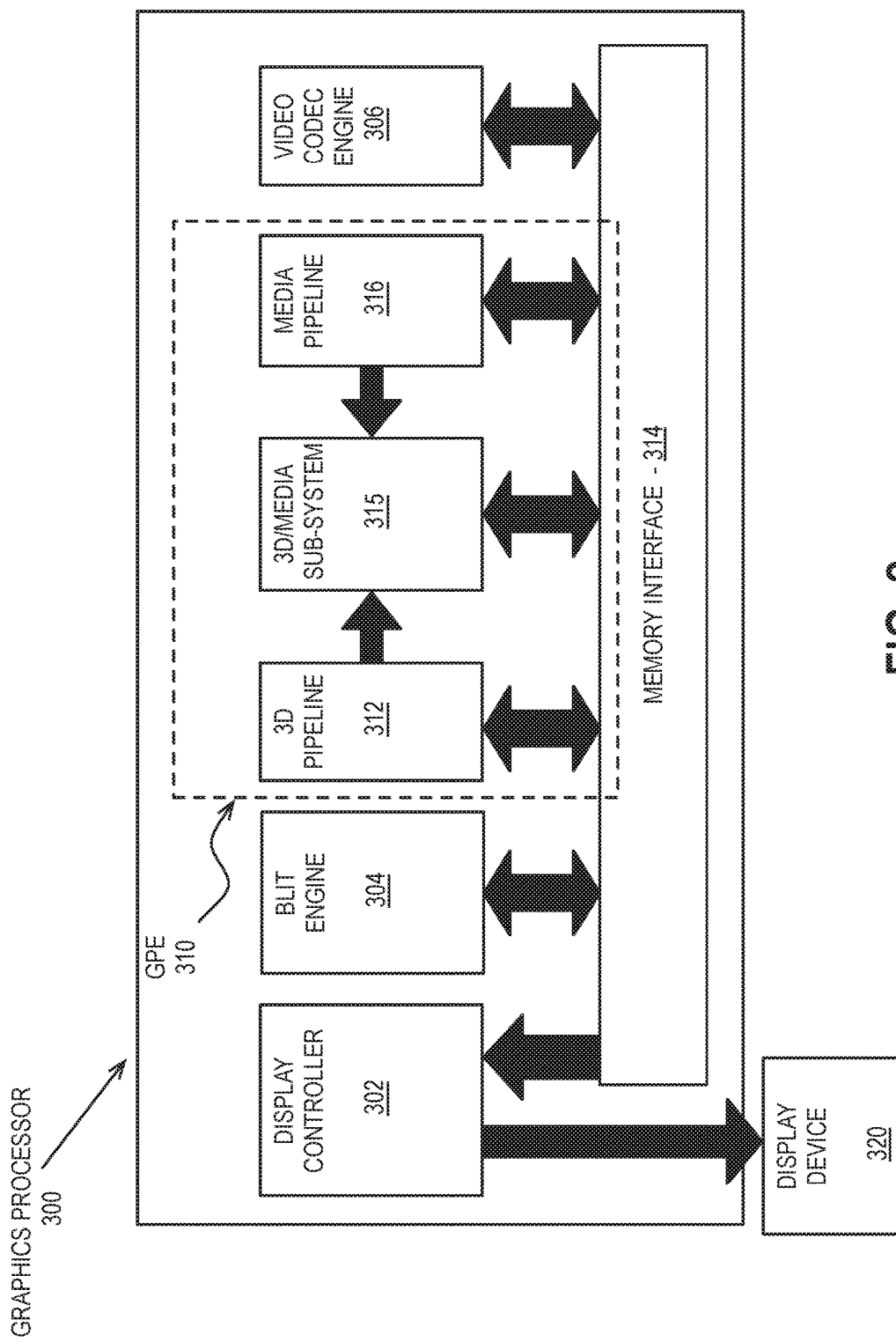
FIG. 3 is a block diagram of one embodiment of a graphics processor which may be a discreet graphics processing unit, or may be graphics processor integrated with a plurality of processing cores.

FIG. 3 is a block diagram of a graphics processor 300, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory.

In some embodiments, graphics processor 300 also includes a display controller 302 to drive display output data to a display device 320. Display controller 302 includes hardware for one or more overlay planes for the display and composition of multiple layers of video or user interface elements. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. However, in one embodiment, 2D graphics operations are performed using one or more components of graphics processing engine (GPE) 310. In some embodiments, graphics processing engine 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media sub-system 315. The spawned threads perform computations for the media operations on one or more graphics execution units included in 3D/Media subsystem 315.

In some embodiments, 3D/Media subsystem 315 includes logic for executing threads spawned by 3D pipeline 312 and media pipeline 316. In one embodiment, the pipelines send thread execution requests to 3D/Media subsystem 315, which includes thread dispatch logic for arbitrating and dispatching the various requests to available thread execution resources. The execution resources include an array of graphics execution units to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

3D/Media Processing

Figure 4:
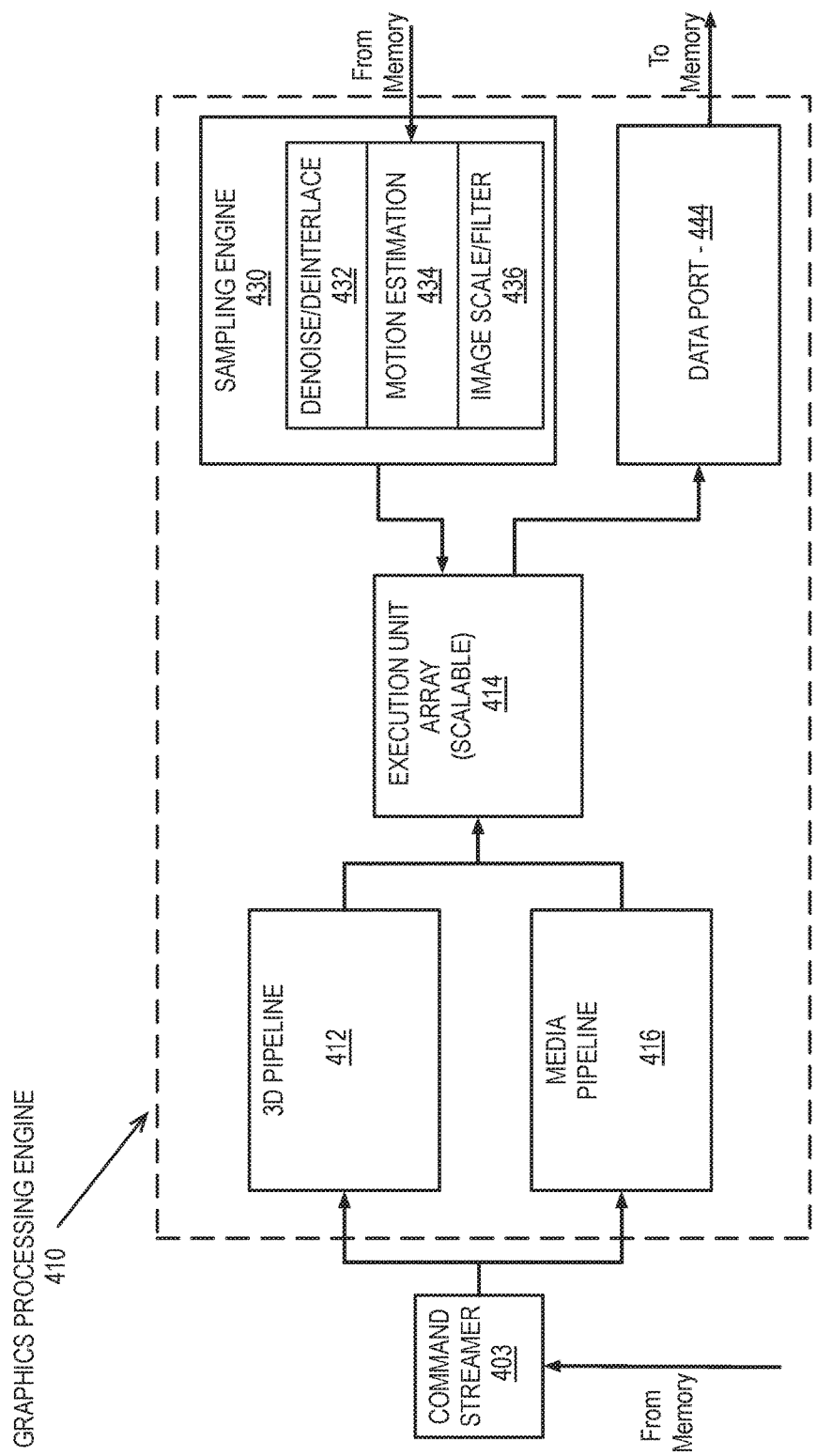
FIG. 4 is a block diagram of an embodiment of a graphics-processing engine for a graphics processor.

FIG. 4 is a block diagram of a graphics processing engine 410 of a graphics processor in accordance with some embodiments. In one embodiment, the GPE 410 is a version of the GPE 310 shown in FIG. 3. Elements of FIG. 4 having the same reference numbers (or names) as the elements of any other figure herein can operate or function in any manner similar to that described elsewhere herein, but are not limited to such.

In some embodiments, GPE 410 couples with a command streamer 403, which provides a command stream to the GPE 3D and media pipelines 412, 416. In some embodiments, command streamer 403 is coupled to memory, which can be system memory, or one or more of internal cache memory and shared cache memory. In some embodiments, command streamer 403 receives commands from the memory and sends the commands to 3D pipeline 412 and/or media pipeline 416. The commands are directives fetched from a ring buffer, which stores commands for the 3D and media pipelines 412, 416. In one embodiment, the ring buffer can additionally include batch command buffers storing batches of multiple commands. The 3D and media pipelines 412, 416 process the commands by performing operations via logic within the respective pipelines or by dispatching one or more execution threads to an execution unit array 414. In some embodiments, execution unit array 414 is scalable, such that the array includes a variable number of execution units based on the target power and performance level of GPE 410.

In some embodiments, a sampling engine 430 couples with memory (e.g., cache memory or system memory) and execution unit array 414. In some embodiments, sampling engine 430 provides a memory access mechanism for execution unit array 414 that allows execution array 414 to read graphics and media data from memory. In some embodiments, sampling engine 430 includes logic to perform specialized image sampling operations for media.

In some embodiments, the specialized media sampling logic in sampling engine 430 includes a de-noise/de-interlace module 432, a motion estimation module 434, and an image scaling and filtering module 436. In some embodiments, de-noise/de-interlace module 432 includes logic to perform one or more of a de-noise or a de-interlace algorithm on decoded video data. The de-interlace logic combines alternating fields of interlaced video content into a single fame of video. The de-noise logic reduces or removes data noise from video and image data. In some embodiments, the de-noise logic and de-interlace logic are motion adaptive and use spatial or temporal filtering based on the amount of motion detected in the video data. In some embodiments, the de-noise/de-interlace module 432 includes dedicated motion detection logic (e.g., within the motion estimation engine 434).

In some embodiments, motion estimation engine 434 provides hardware acceleration for video operations by performing video acceleration functions such as motion vector estimation and prediction on video data. The motion estimation engine determines motion vectors that describe the transformation of image data between successive video frames. In some embodiments, a graphics processor media codec uses video motion estimation engine 434 to perform operations on video at the macro-block level that may otherwise be too computationally intensive to perform with a general-purpose processor. In some embodiments, motion estimation engine 434 is generally available to graphics processor components to assist with video decode and processing functions that are sensitive or adaptive to the direction or magnitude of the motion within video data.

In some embodiments, image scaling and filtering module 436 performs image-processing operations to enhance the visual quality of generated images and video. In some embodiments, scaling and filtering module 436 processes image and video data during the sampling operation before providing the data to execution unit array 414.

In some embodiments, the GPE 410 includes a data port 444, which provides an additional mechanism for graphics subsystems to access memory. In some embodiments, data port 444 facilitates memory access for operations including render target writes, constant buffer reads, scratch memory space reads/writes, and media surface accesses. In some embodiments, data port 444 includes cache memory space to cache accesses to memory. The cache memory can be a single data cache or separated into multiple caches for the multiple subsystems that access memory via the data port (e.g., a render buffer cache, a constant buffer cache, etc.). In some embodiments, threads executing on an execution unit in execution unit array 414 communicate with the data port by exchanging messages via a data distribution interconnect that couples each of the sub-systems of GPE 410.

Execution Units

Figure 5:
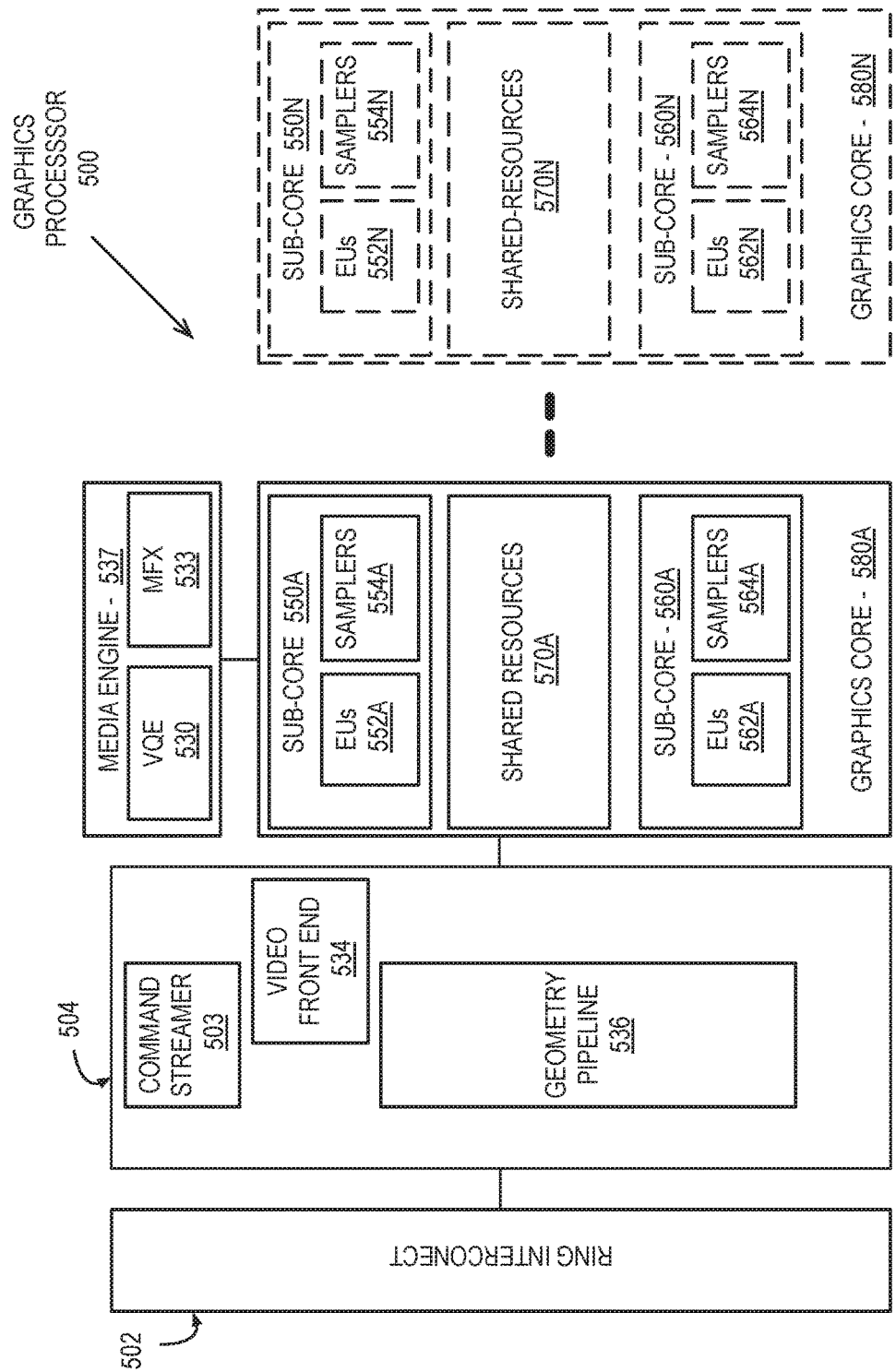
FIG. 5 is a block diagram of another embodiment of a graphics processor.

FIG. 5 is a block diagram of another embodiment of a graphics processor 500. Elements of FIG. 5 having the same reference numbers (or names) as the elements of any other figure herein can operate or function in any manner similar to that described elsewhere herein, but are not limited to such.

In some embodiments, graphics processor 500 includes a ring interconnect 502, a pipeline front-end 504, a media engine 537, and graphics cores 580A-580N. In some embodiments, ring interconnect 502 couples the graphics processor to other processing units, including other graphics processors or one or more general-purpose processor cores. In some embodiments, the graphics processor is one of many processors integrated within a multi-core processing system.

In some embodiments, graphics processor 500 receives batches of commands via ring interconnect 502. The incoming commands are interpreted by a command streamer 503 in the pipeline front-end 504. In some embodiments, graphics processor 500 includes scalable execution logic to perform 3D geometry processing and media processing via the graphics core(s) 580A-580N. For 3D geometry processing commands, command streamer 503 supplies commands to geometry pipeline 536. For at least some media processing commands, command streamer 503 supplies the commands to a video front end 534, which couples with a media engine 537. In some embodiments, media engine 537 includes a Video Quality Engine (VQE) 530 for video and image post-processing and a multi-format encode/decode (MFX) 533 engine to provide hardware-accelerated media data encode and decode. In some embodiments, geometry pipeline 536 and media engine 537 each generate execution threads for the thread execution resources provided by at least one graphics core 580A.

In some embodiments, graphics processor 500 includes scalable thread execution resources featuring modular cores 580A-580N (sometimes referred to as core slices), each having multiple sub-cores 550A-550N, 560A-560N (sometimes referred to as core sub-slices). In some embodiments, graphics processor 500 can have any number of graphics cores 580A through 580N. In some embodiments, graphics processor 500 includes a graphics core 580A having at least a first sub-core 550A and a second core sub-core 560A. In other embodiments, the graphics processor is a low power processor with a single sub-core (e.g., 550A). In some embodiments, graphics processor 500 includes multiple graphics cores 580A-580N, each including a set of first sub-cores 550A-550N and a set of second sub-cores 560A-560N. Each sub-core in the set of first sub-cores 550A-550N includes at least a first set of execution units 552A-552N and media/texture samplers 554A-554N. Each sub-core in the set of second sub-cores 560A-560N includes at least a second set of execution units 562A-562N and samplers 564A-564N. In some embodiments, each sub-core 550A-550N, 560A-560N shares a set of shared resources 570A-570N. In some embodiments, the shared resources include shared cache memory and pixel operation logic. Other shared resources may also be included in the various embodiments of the graphics processor.

Figure 6:
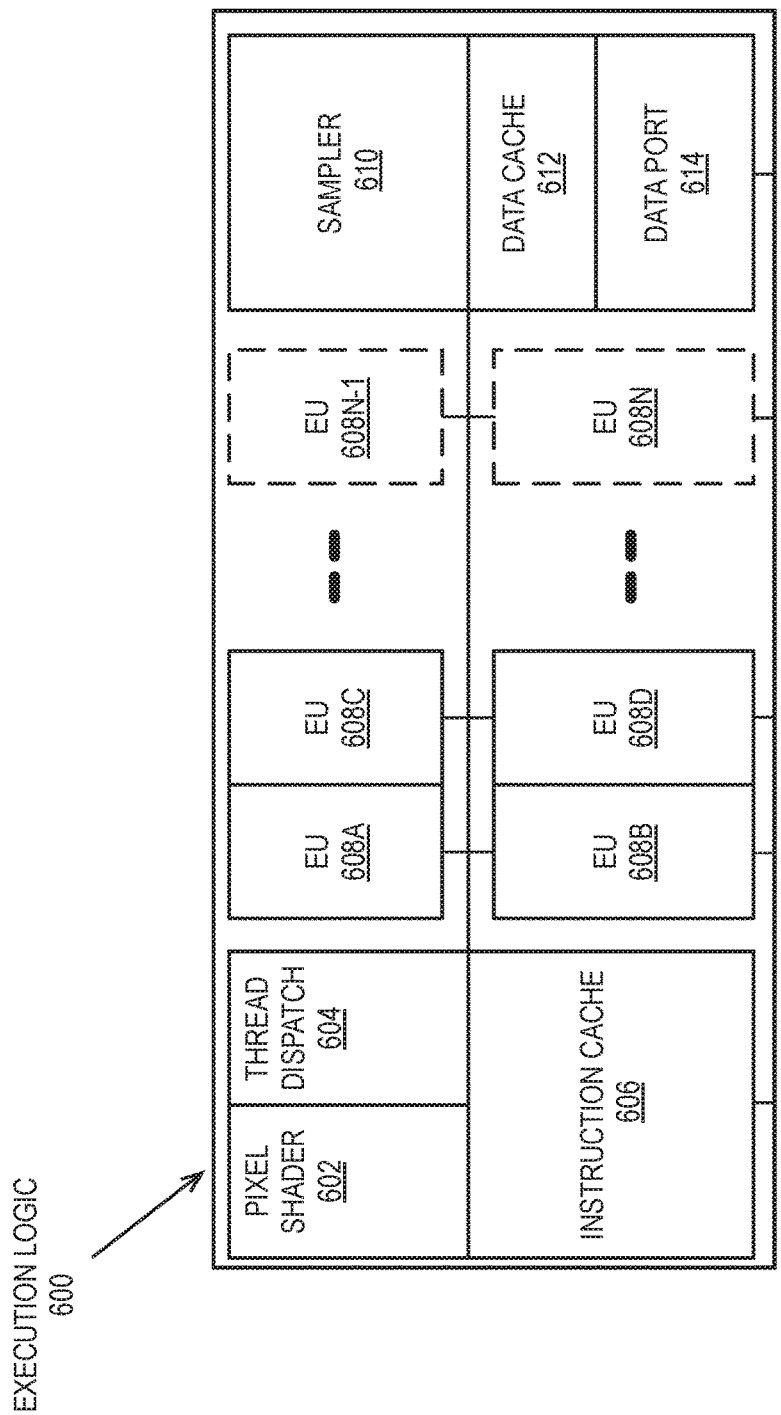
FIG. 6 is a block diagram of thread execution logic including an array of processing elements.

FIG. 6 illustrates thread execution logic 600 including an array of processing elements employed in some embodiments of a GPE. Elements of FIG. 6 having the same reference numbers (or names) as the elements of any other figure herein can operate or function in any manner similar to that described elsewhere herein, but are not limited to such.

In some embodiments, thread execution logic 600 includes a pixel shader 602, a thread dispatcher 604, instruction cache 606, a scalable execution unit array including a plurality of execution units 608A-608N, a sampler 610, a data cache 612, and a data port 614. In one embodiment the included components are interconnected via an interconnect fabric that links to each of the components. In some embodiments, thread execution logic 600 includes one or more connections to memory, such as system memory or cache memory, through one or more of instruction cache 606, data port 614, sampler 610, and execution unit array 608A-608N. In some embodiments, each execution unit (e.g. 608A) is an individual vector processor capable of executing multiple simultaneous threads and processing multiple data elements in parallel for each thread. In some embodiments, execution unit array 608A-608N includes any number individual execution units.

In some embodiments, execution unit array 608A-608N is primarily used to execute "shader" programs. In some embodiments, the execution units in array 608A-608N execute an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders).

Each execution unit in execution unit array 608A-608N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 608A-608N support integer and floating-point data types.

The execution unit instruction set includes single instruction multiple data (SIMD) instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

One or more internal instruction caches (e.g., 606) are included in the thread execution logic 600 to cache thread instructions for the execution units. In some embodiments, one or more data caches (e.g., 612) are included to cache thread data during thread execution. In some embodiments, sampler 610 is included to provide texture sampling for 3D operations and media sampling for media operations. In some embodiments, sampler 610 includes specialized texture or media sampling functionality to process texture or media data during the sampling process before providing the sampled data to an execution unit.

During execution, the graphics and media pipelines send thread initiation requests to thread execution logic 600 via thread spawning and dispatch logic. In some embodiments, thread execution logic 600 includes a local thread dispatcher 604 that arbitrates thread initiation requests from the graphics and media pipelines and instantiates the requested threads on one or more execution units 608A-608N. For example, the geometry pipeline (e.g., 536 of FIG. 5) dispatches vertex processing, tessellation, or geometry processing threads to thread execution logic 600 (FIG. 6). In some embodiments, thread dispatcher 604 can also process runtime thread spawning requests from the executing shader programs.

Once a group of geometric objects has been processed and rasterized into pixel data, pixel shader 602 is invoked to further compute output information and cause results to be written to output surfaces (e.g., color buffers, depth buffers, stencil buffers, etc.). In some embodiments, pixel shader 602 calculates the values of the various vertex attributes that are to be interpolated across the rasterized object. In some embodiments, pixel shader 602 then executes an application programming interface (API)-supplied pixel shader program. To execute the pixel shader program, pixel shader 602 dispatches threads to an execution unit (e.g., 608A) via thread dispatcher 604. In some embodiments, pixel shader 602 uses texture sampling logic in sampler 610 to access texture data in texture maps stored in memory. Arithmetic operations on the texture data and the input geometry data compute pixel color data for each geometric fragment, or discards one or more pixels from further processing.

In some embodiments, the data port 614 provides a memory access mechanism for the thread execution logic 600 output processed data to memory for processing on a graphics processor output pipeline. In some embodiments, the data port 614 includes or couples to one or more cache memories (e.g., data cache 612) to cache data for memory access via the data port.

Figure 7:
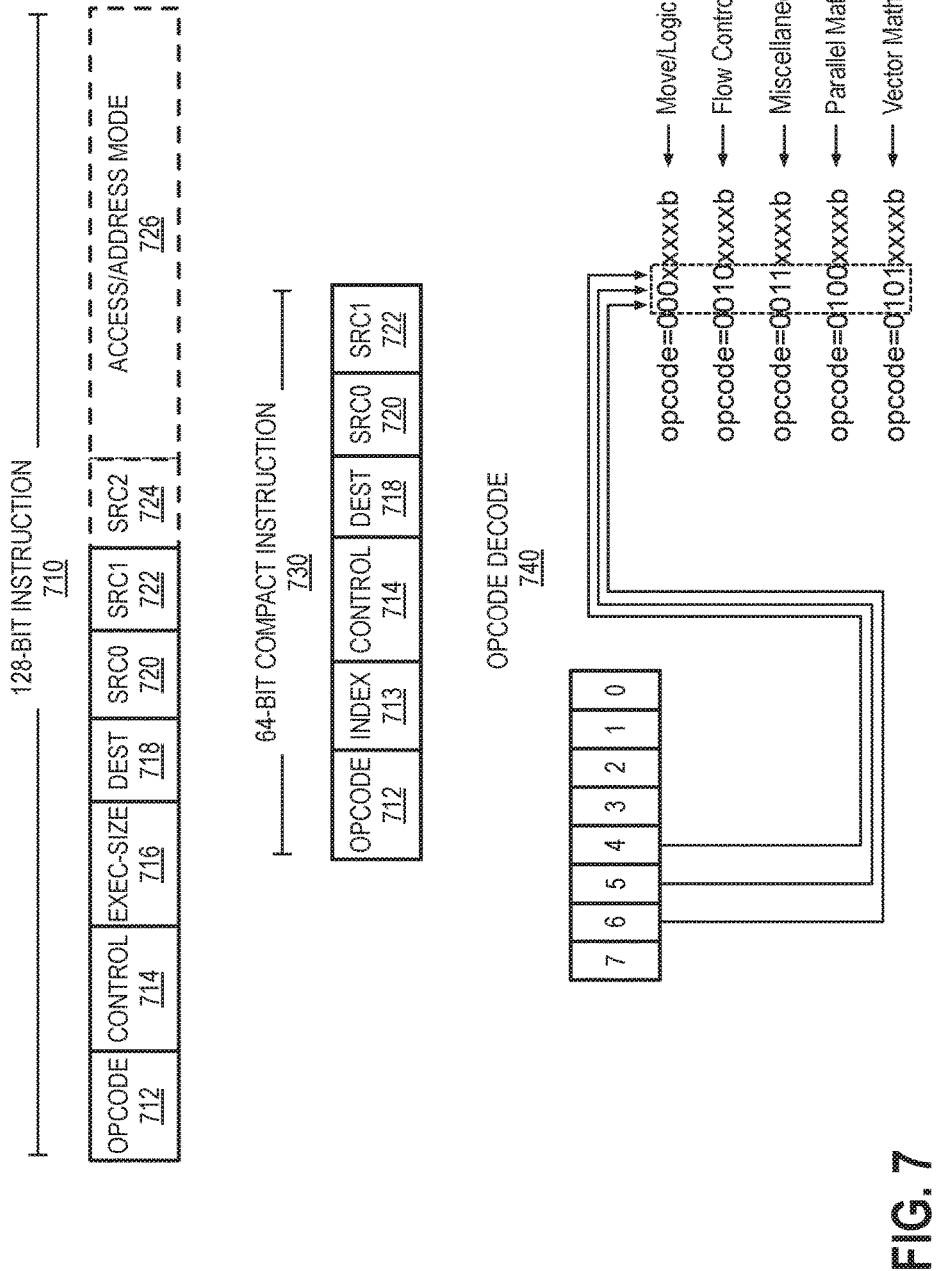
FIG. 7 illustrates a graphics processor execution unit instruction format according to an embodiment.

FIG. 7 is a block diagram illustrating a graphics processor instruction formats 700 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 700 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit format 710. A 64-bit compacted instruction format 730 is available for some instructions based on the selected instruction, instruction options, and number of operands. The native 128-bit format 710 provides access to all instruction options, while some options and operations are restricted in the 64-bit format 730. The native instructions available in the 64-bit format 730 vary by embodiment. In some embodiments, the instruction is compacted in part using a set of index values in an index field 713. The execution unit hardware references a set of compaction tables based on the index values and uses the compaction table outputs to reconstruct a native instruction in the 128-bit format 710.

For each format, instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 714 enables control over certain execution options, such as channels selection (e.g., predication) and data channel order (e.g., swizzle). For 128-bit instructions 710 an exec-size field 716 limits the number of data channels that will be executed in parallel. In some embodiments, exec-size field 716 is not available for use in the 64-bit compact instruction format 730.

Some execution unit instructions have up to three operands including two source operands, src0 722, src1 722, and one destination 718. In some embodiments, the execution units support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In some embodiments, the 128-bit instruction format 710 includes an access/address mode information 726 specifying, for example, whether direct register addressing mode or indirect register addressing mode is used. When direct register addressing mode is used, the register address of one or more operands is directly provided by bits in the instruction 710.

In some embodiments, the 128-bit instruction format 710 includes an access/address mode field 726, which specifies an address mode and/or an access mode for the instruction. In one embodiment the access mode to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction 710 may use byte-aligned addressing for source and destination operands and when in a second mode, the instruction 710 may use 16-byte-aligned addressing for all source and destination operands.

In one embodiment, the address mode portion of the access/address mode field 726 determines whether the instruction is to use direct or indirect addressing. When direct register addressing mode is used bits in the instruction 710 directly provide the register address of one or more operands. When indirect register addressing mode is used, the register address of one or more operands may be computed based on an address register value and an address immediate field in the instruction.

In some embodiments instructions are grouped based on opcode 712 bit-fields to simplify Opcode decode 740. For an 8-bit opcode, bits 4, 5, and 6 allow the execution unit to determine the type of opcode. The precise opcode grouping shown is merely an example. In some embodiments, a move and logic opcode group 742 includes data movement and logic instructions (e.g., move (mov), compare (cmp)). In some embodiments, move and logic group 742 shares the five most significant bits (MSB), where move (mov) instructions are in the form of 0000xxxxb and logic instructions are in the form of 0001xxxxb. A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Graphics Pipeline

Figure 8:
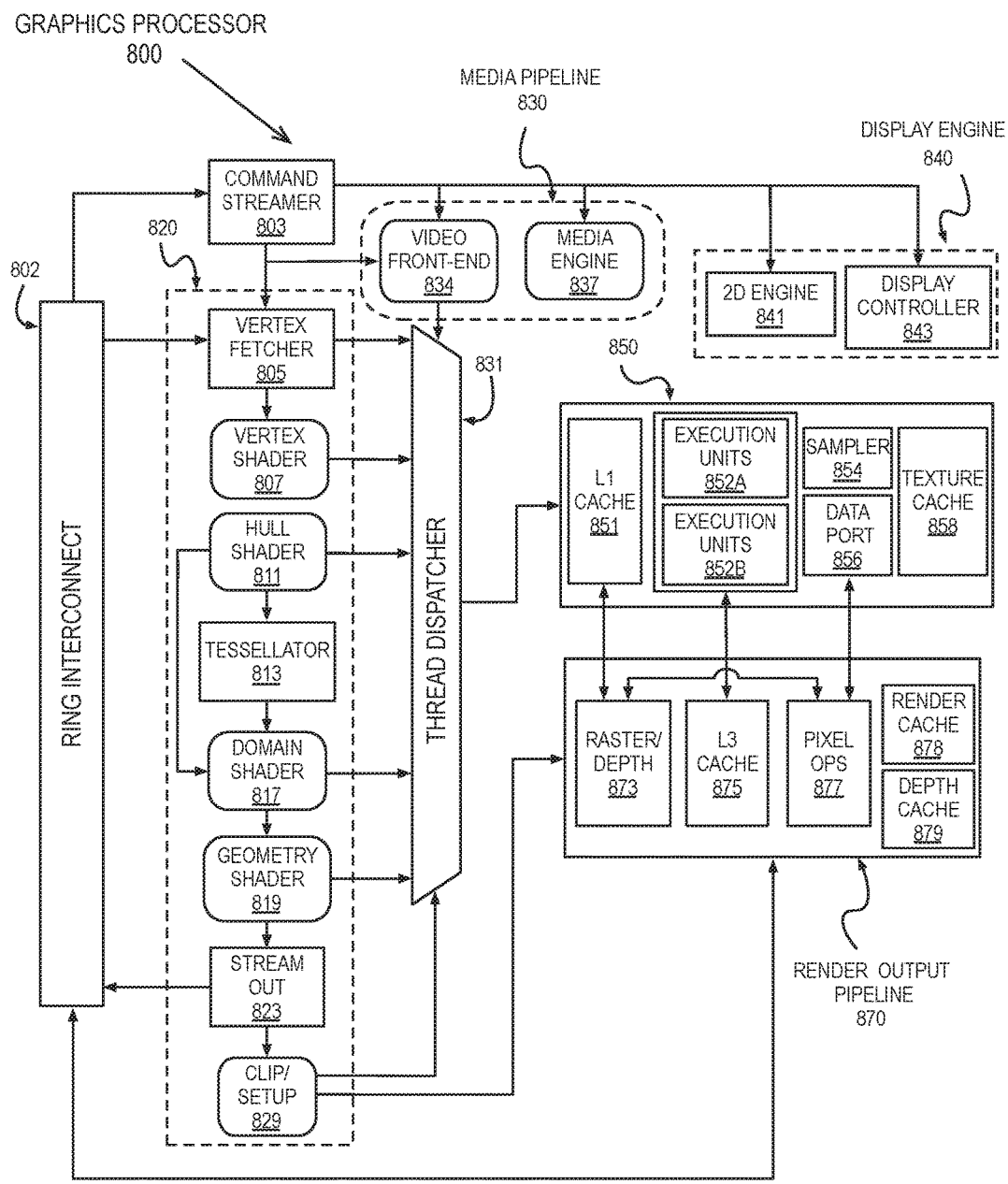
FIG. 8 is a block diagram of another embodiment of a graphics processor which includes a graphics pipeline, a media pipeline, a display engine, thread execution logic, and a render output pipeline.
Figure 9:
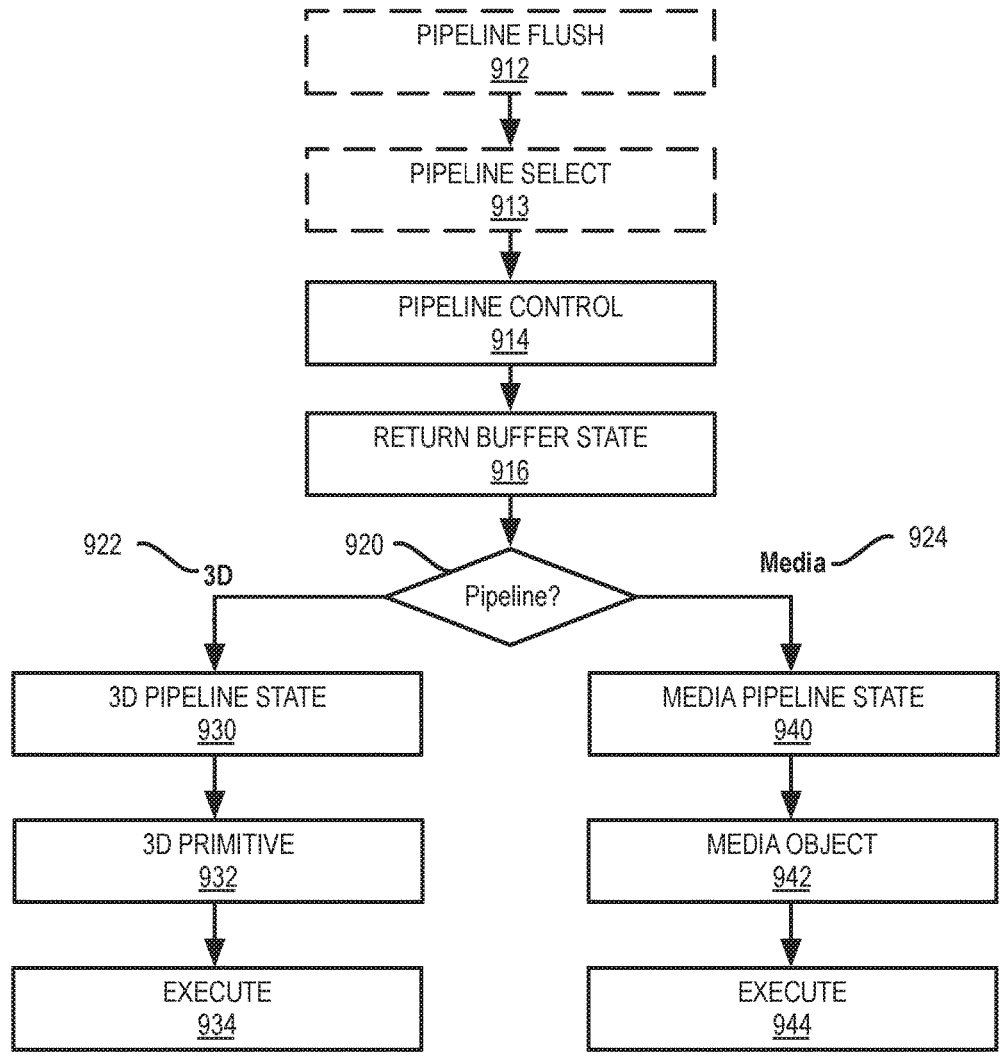
FIG. 9A is a block diagram illustrating a graphics processor command format according to an embodiment.
FIG. 9B is a block diagram illustrating a graphics processor command sequence according to an embodiment.

FIG. 8 is a block diagram of another embodiment of a graphics processor 800. Elements of FIG. 8 having the same reference numbers (or names) as the elements of any other figure herein can operate or function in any manner similar to that described elsewhere herein, but are not limited to such.

In some embodiments, graphics processor 800 includes a graphics pipeline 820, a media pipeline 830, a display engine 840, thread execution logic 850, and a render output pipeline 870. In some embodiments, graphics processor 800 is a graphics processor within a multi-core processing system that includes one or more general-purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of graphics pipeline 820 or media pipeline 830.

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 and vertex shader 807 execute vertex-processing instructions by dispatching execution threads to execution units 852A, 852B via a thread dispatcher 831.

In some embodiments, execution units 852A, 852B are an array of vector processors having an instruction set for performing graphics and media operations. In some embodiments, execution units 852A, 852B have an attached L1 cache 851 that is specific for each array or shared between the arrays. The cache can be configured as a data cache, an instruction cache, or a single cache that is partitioned to contain data and instructions in different partitions.

In some embodiments, graphics pipeline 820 includes tessellation components to perform hardware-accelerated tessellation of 3D objects. In some embodiments, a programmable hull shader 811 configures the tessellation operations. A programmable domain shader 817 provides back-end evaluation of tessellation output. A tessellator 813 operates at the direction of hull shader 811 and contains special purpose logic to generate a set of detailed geometric objects based on a coarse geometric model that is provided as input to graphics pipeline 820. In some embodiments, if tessellation is not used, tessellation components 811, 813, 817 can be bypassed.

In some embodiments, complete geometric objects can be processed by a geometry shader 819 via one or more threads dispatched to execution units 852A, 852B, or can proceed directly to the clipper 829. In some embodiments, the geometry shader operates on entire geometric objects, rather than vertices or patches of vertices as in previous stages of the graphics pipeline. If the tessellation is disabled the geometry shader 819 receives input from the vertex shader 807. In some embodiments, geometry shader 819 is programmable by a geometry shader program to perform geometry tessellation if the tessellation units are disabled.

Before rasterization, a clipper 829 processes vertex data. The clipper 829 may be a fixed function clipper or a programmable clipper having clipping and geometry shader functions. In some embodiments, a rasterizer and depth test component 873 in the render output pipeline 870 dispatches pixel shaders to convert the geometric objects into their per pixel representations. In some embodiments, pixel shader logic is included in thread execution logic 850. In some embodiments, an application can bypass the rasterizer 873 and access un-rasterized vertex data via a stream out unit 823.

The graphics processor 800 has an interconnect bus, interconnect fabric, or some other interconnect mechanism that allows data and message passing amongst the major components of the processor. In some embodiments, execution units 852A, 852B and associated cache(s) 851, texture and media sampler 854, and texture/sampler cache 858 interconnect via a data port 856 to perform memory access and communicate with render output pipeline components of the processor. In some embodiments, sampler 854, caches 851, 858 and execution units 852A, 852B each have separate memory access paths.

In some embodiments, render output pipeline 870 contains a rasterizer and depth test component 873 that converts vertex-based objects into an associated pixel-based representation. In some embodiments, the render output pipeline 870 includes a windower/masker unit to perform fixed function triangle and line rasterization. An associated render cache 878 and depth cache 879 are also available in some embodiments. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In some embodiments, a shared L3 cache 875 is available to all graphics components, allowing the sharing of data without the use of main system memory.

In some embodiments, graphics processor media pipeline 830 includes a media engine 837 and a video front end 834. In some embodiments, video front end 834 receives pipeline commands from the command streamer 803. In some embodiments, media pipeline 830 includes a separate command streamer. In some embodiments, video front-end 834 processes media commands before sending the command to the media engine 837. In some embodiments, media engine 337 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, graphics pipeline 820 and media pipeline 830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL) and Open Computing Language (OpenCL) from the Khronos Group, the Direct3D library from the Microsoft Corporation, or support may be provided to both OpenGL and D3D. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

FIG. 9A is a block diagram illustrating a graphics processor command format 900 according to some embodiments. FIG. 9B is a block diagram illustrating a graphics processor command sequence 910 according to an embodiment. The solid lined boxes in FIG. 9A illustrate the components that are generally included in a graphics command while the dashed lines include components that are optional or that are only included in a sub-set of the graphics commands. The exemplary graphics processor command format 900 of FIG. 9A includes data fields to identify a target client 902 of the command, a command operation code (opcode) 904, and the relevant data 906 for the command. A sub-opcode 905 and a command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in data field 906. For some commands an explicit command size 908 is expected to specify the size of the command. In some embodiments, the command parser automatically determines the size of at least some of the commands based on the command opcode. In some embodiments commands are aligned via multiples of a double word.

The flow diagram in FIG. 9B shows an exemplary graphics processor command sequence 910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 910 may begin with a pipeline flush command 912 to cause any active graphics pipeline to complete the currently pending commands for the pipeline. In some embodiments, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, a pipeline select command 913 is used when a command sequence requires the graphics processor to explicitly switch between pipelines. In some embodiments, a pipeline select command 913 is required only once within an execution context before issuing pipeline commands unless the context is to issue commands for both pipelines. In some embodiments, a pipeline flush command is 912 is required immediately before a pipeline switch via the pipeline select command 913.

In some embodiments, a pipeline control command 914 configures a graphics pipeline for operation and is used to program the 3D pipeline 922 and the media pipeline 924. In some embodiments, pipeline control command 914 configures the pipeline state for the active pipeline. In one embodiment, the pipeline control command 914 is used for pipeline synchronization and to clear data from one or more cache memories within the active pipeline before processing a batch of commands.

In some embodiments, return buffer state commands 916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930, or the media pipeline 924 beginning at the media pipeline state 940.

The commands for the 3D pipeline state 930 include 3D state setting commands for vertex buffer state, vertex element state, constant color state, depth buffer state, and other state variables that are to be configured before 3D primitive commands are processed. The values of these commands are determined at least in part based the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader execution threads to graphics processor execution units.

In some embodiments, 3D pipeline 922 is triggered via an execute 934 command or event. In some embodiments, a register write triggers command execution. In some embodiments execution is triggered via a 'go' or 'kick' command in the command sequence. In one embodiment command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some embodiments, the media pipeline can also be bypassed and media decode can be performed in whole or in part using resources provided by one or more general-purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as the 3D pipeline 922. A set of media pipeline state commands 940 are dispatched or placed into in a command queue before the media object commands 942. In some embodiments, media pipeline state commands 940 include data to configure the media pipeline elements that will be used to process the media objects. This includes data to configure the video decode and video encode logic within the media pipeline, such as encode or decode format. In some embodiments, media pipeline state commands 940 also support the use one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states must be valid before issuing a media object command 942. Once the pipeline state is configured and media object commands 942 are queued, the media pipeline 924 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Graphics Software Architecture

Figure 10:
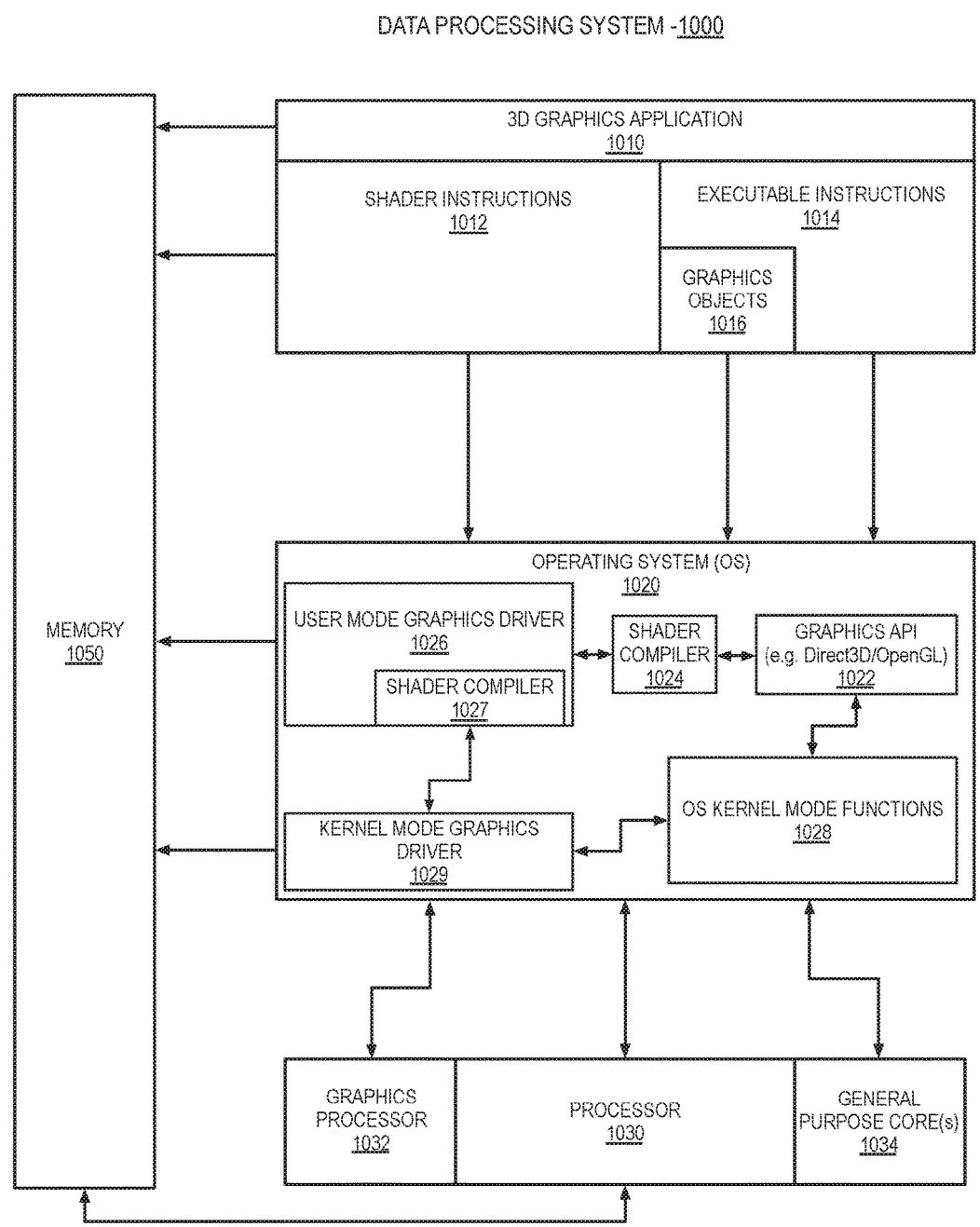
FIG. 10 illustrates exemplary graphics software architecture for a data processing system according to an embodiment.

FIG. 10 illustrates exemplary graphics software architecture for a data processing system 1000 according to some embodiments. In some embodiments, software architecture includes a 3D graphics application 1010, an operating system 1020, and at least one processor 1030. In some embodiments, processor 1030 includes a graphics processor 1032 and one or more general-purpose processor core(s) 1034. The graphics application 1010 and operating system 1020 each execute in the system memory 1050 of the data processing system.

In some embodiments, 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core 1034. The application also includes graphics objects 1016 defined by vertex data.

In some embodiments, operating system 1020 is a Microsoft® Windows® operating system from the Microsoft Corporation, a proprietary UNIX-like operating system, or an open source UNIX-like operating system using a variant of the Linux kernel. When the Direct3D API is in use, the operating system 1020 uses a front-end shader compiler 1024 to compile any shader instructions 1012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1010.

In some embodiments, user mode graphics driver 1026 contains a back-end shader compiler 1027 to convert the shader instructions 1012 into a hardware specific representation. When the OpenGL API is in use, shader instructions 1012 in the GLSL high-level language are passed to a user mode graphics driver 1026 for compilation. In some embodiments, user mode graphics driver 1026 uses operating system kernel mode functions 1028 to communicate with a kernel mode graphics driver 1029. In some embodiments, kernel mode graphics driver 1029 communicates with graphics processor 1032 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 11:
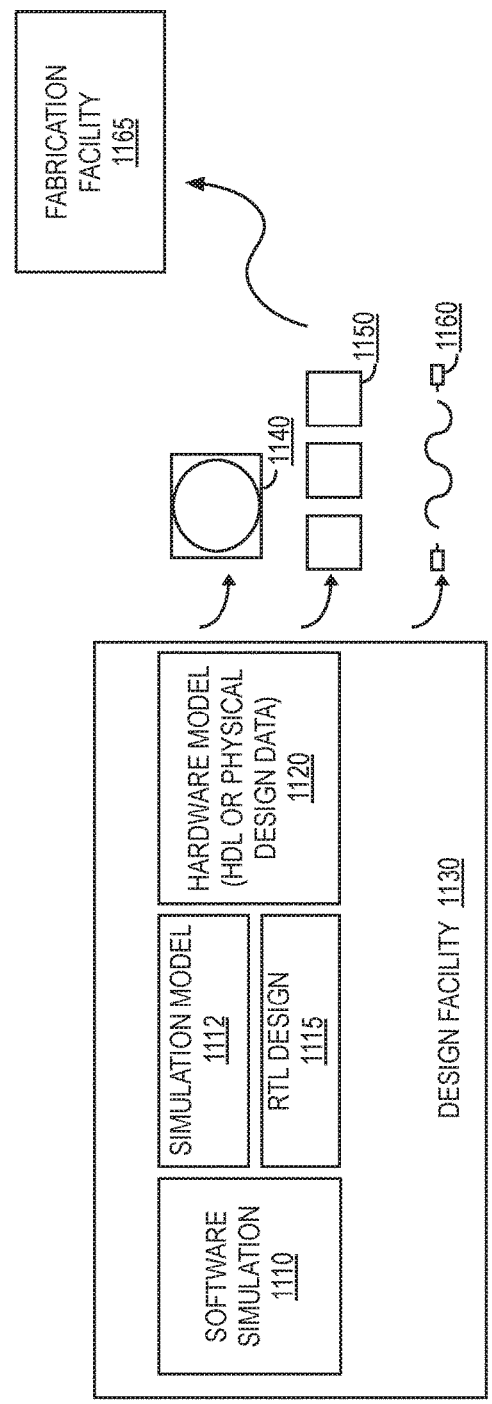
FIG. 11 is a block diagram illustrating an IP core development system that may be used to manufacture an integrated circuit to perform operations according to an embodiment.

FIG. 11 is a block diagram illustrating an IP core development system 1100 that may be used to manufacture an integrated circuit to perform operations according to an embodiment. The IP core development system 1100 may be used to generate modular, re-usable designs that can be incorporated into a larger design or used to construct an entire integrated circuit (e.g., an SOC integrated circuit). A design facility 1130 can generate a software simulation 1110 of an IP core design in a high level programming language (e.g., C/C++). The software simulation 1110 can be used to design, test, and verify the behavior of the IP core. A register transfer level (RTL) design can then be created or synthesized from the simulation model 1100. The RTL design 1115 is an abstraction of the behavior of the integrated circuit that models the flow of digital signals between hardware registers, including the associated logic performed using the modeled digital signals. In addition to an RTL design 1115, lower-level designs at the logic level or transistor level may also be created, designed, or synthesized. Thus, the particular details of the initial design and simulation may vary.

The RTL design 1115 or equivalent may be further synthesized by the design facility into a hardware model 1120, which may be in a hardware description language (HDL), or some other representation of physical design data. The HDL may be further simulated or tested to verify the IP core design. The IP core design can be stored for delivery to a 3$^{rd}$ party fabrication facility 1165 using non-volatile memory 1140 (e.g., hard disk, flash memory, or any non-volatile storage medium). Alternatively, the IP core design may be transmitted (e.g., via the Internet) over a wired connection 1150 or wireless connection 1160. The fabrication facility 1165 may then fabricate an integrated circuit that is based at least in part on the IP core design. The fabricated integrated circuit can be configured to perform operations in accordance with at least one embodiment described herein.

Figure 12:
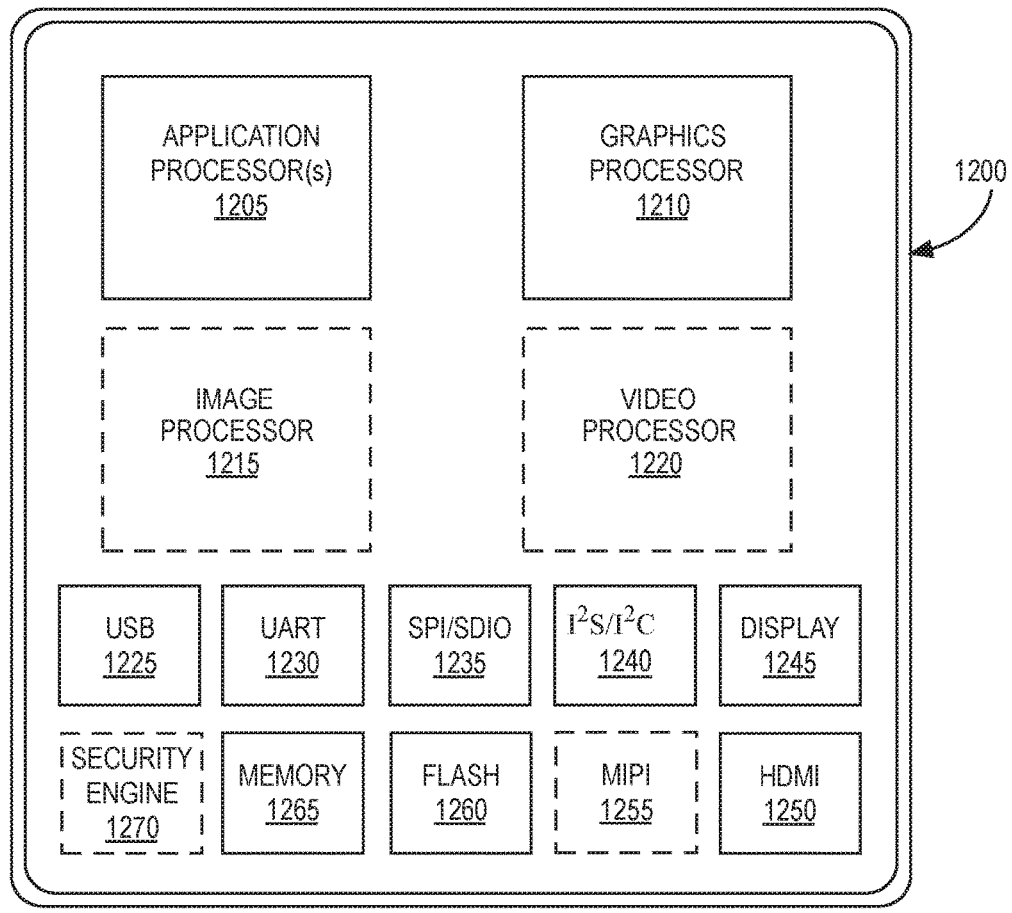
FIG. 12 is a block diagram illustrating an exemplary system on a chip integrated circuit that may be fabricated using one or more IP cores, according to an embodiment.

FIG. 12 is a block diagram illustrating an exemplary system on a chip integrated circuit 1200 that may be fabricated using one or more IP cores, according to an embodiment. The exemplary integrated circuit includes one or more application processors 1205 (e.g., CPUs), at least one graphics processor 1210, and may additionally include an image processor 1215 and/or a video processor 1220, any of which may be a modular IP core from the same or multiple different design facilities. The integrated circuit includes peripheral or bus logic including a USB controller 1225, UART controller 1230, an SPI/SDIO controller 1235, and an I$^2$S/I$^2$C controller 1240. Additionally, the integrated circuit can include a display device 1245 coupled to one or more of a high-definition multimedia interface (HDMI) controller 1250 and a mobile industry processor interface (MIPI) display interface 1255. Storage may be provided by a flash memory subsystem 1260 including flash memory and a flash memory controller. Memory interface may be provided via a memory controller 1265 for access to SDRAM or SRAM memory devices. Some integrated circuits additionally include an embedded security engine 1270.

Additionally, other logic and circuits may be included in the processor of integrated circuit 1200, including additional graphics processors/cores, peripheral interface controllers, or general-purpose processor cores.

Optimizing for Rendering with Clear Color

In most common rendering scenarios, an application will perform a clear operation on a framebuffer before rendering to the framebuffer. In one implementation, the clear operation is optimized using a set of control bits. Instead of clearing the framebuffer, cache lines representing the framebuffer are marked as "CLEAR." This represents a significant optimization because one or two control bits can represent multiple cache lines. When areas of the framebuffer are rendered, the control bits can be marked as "DATA," "COMPRESSED," or other states that indicate that the framebuffer includes data that data is to be read from the frame buffer. For the discussion that follows, "COMPRESSED" or other states can be lumped together as "DATA".

Embodiments described herein provide for graphics hardware having end-to-end clear color optimizations that suppresses clear writes having the same color as the clear color as well as optimizing the sampler and display hardware to take advantage of the clear color. When cache lines with "CLEAR" control bits are to be fetched for other operations, instead of fetching the clear color by reading the framebuffer memory, the data in the framebuffer is substituted with the clear color value in a register.

Accordingly, rendering scenarios making extensive use of the clear color can realize a significant reduction in memory bandwidth if such regions of "clear color" rendering were continued to be tracked as "CLEAR".

In one embodiment, if lines of the framebuffer are rendered but the renderer result matches the "clear color", the state of the control bits for that region of the framebuffer are marked as CLEAR. This would happen even if the lines had previously transitioned to the DATA state. When the lines are marked as CLEAR instead of DATA, the graphics processor is not required to write out CLEAR cache lines of the framebuffer. Instead, the graphics processor unit (GPU) updates the few control bits associated with the relevant lines of the framebuffer. This results in a reduced number of memory transactions that can reduce the overall amount of memory bandwidth and system power consumed during rendering operations. For example, in one embodiment the GPU includes local cache memory. When a set of cache lines is to be evicted to memory, the data in the cache lines can be checked for the clear color. If the data matches the clear color, then the data in the cache is discarded without writing back to memory.

In one embodiment, after a surface is rendered using the optimizations described herein, the surfaces may be used as input textures or may be used to drive the display, resulting in a further reduction in memory bandwidth consumed, as the texture sampler and the display engine do not have to fetch data for cache lines in the CLEAR state. Instead, the texture sample and display engine can use a register which has clear color data information instead of fetching the data from memory.

It is contemplated that in graphics, images can be complicated and their rendering on frames may be just as complicated. It is therefore contemplated that embodiments are not limited to any particular or specific form of frames, images, control bits, networks, transmission techniques, protocols, etc. The illustrations and description of rendering operations herein are provided for exemplary purposes and are simplified for the sake of brevity, clarity, and ease of understanding.

The systems and processes depicted in the figures that follow are exemplary of or are performed by processing logic that comprises hardware (e.g., circuitry, dedicated logic, etc.), software (such as is run on a general-purpose computer system or a dedicated or specialized machine), or a combination of both. Although some of the processes are described below in terms of sequential operations, it should be appreciated that some of the operations described may be performed in a different order. Moreover, some operations may be performed in parallel rather than sequentially.

A typical 3D application has a rendering sequence as follows. First, the application can clear the framebuffer using a clear color, which may be any arbitrary color. Second, the application can then render the scene using primitives (e.g., triangles, lines, rectangles). Some of the primitives may generate the same framebuffer value as the clear color from the previous step. It should be noted that graphics applications have become very complex with multiple intermediate framebuffers. Some of the intermediate buffers store information such as lighting parameters and some of the lighting parameters might match the initial clear color. For example, if the initial clear color value was black and there is no specular lighting contribution, the associated lighting parameters would also be black. Finally, the application can display or use the framebuffer as a source image for other operations. Exemplary rendering operations are illustrated in FIG. 13.

Figure 13:
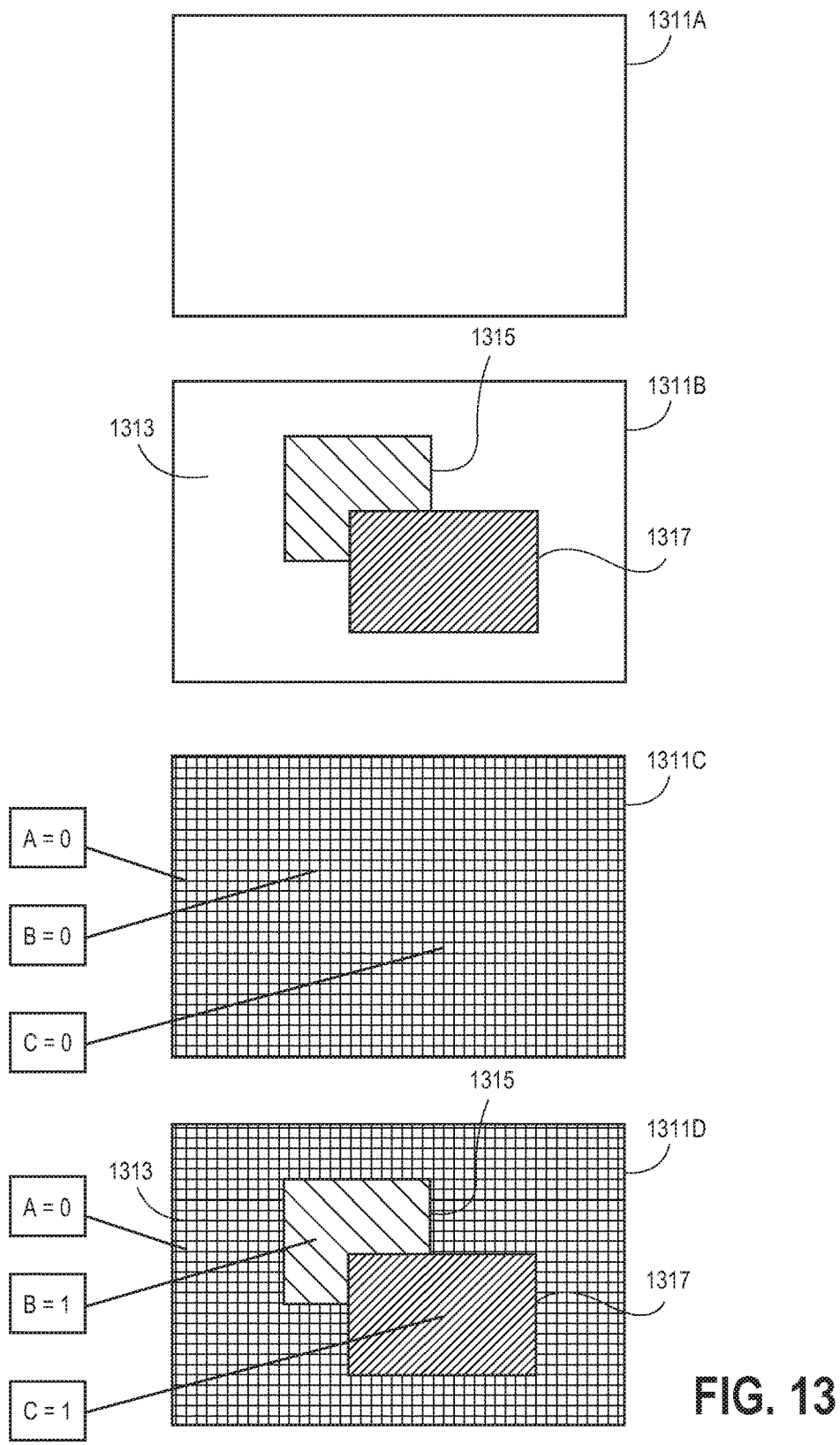
FIG. 13 illustrates an application rendering sequence for optimizing color buffer clear performance.

FIG. 13 illustrates an application rendering sequence for optimizing color buffer clear performance. The illustrated sequence begins with framebuffer 1311A of a frame being cleared with a color (e.g., green, blue, red, black, white, etc.). As illustrated, after this initial clearing operation, framebuffer 1311A may be regarded as a clear framebuffer with a single color occupying all its portions. The number of pixels or memory written for the clear is the full framebuffer.

Subsequently, as illustrated, any amount and type of data may be rendered to occupy corresponding portions 1315, 1317 of framebuffer 1311B. For example, multiple graphics images can occupy portions 1315, 1317 and the corresponding memory buffers of framebuffer 1311B. It is further illustrated that upon having occupied portions 1315, 1317 of framebuffer 1311B, the remaining portion 1313 of framebuffer 1311B and its associate memory buffers remain clear as it was previously the case with reference to framebuffer 1311A. However, it is to be noted that even though regions 1315 and 1317 were over-written with other content and hence there was no need to clear them, they were cleared when the full framebuffer was cleared in 1311A.

The wasted clear operations can be optimized in some embodiments. In one such embodiment, clear operations are optimized by tracking the state of the framebuffer instead of performing an actual clear of the framebuffer. The states of framebuffer 1311A and 1311B are further illustrated with reference to framebuffer 1311C and 1311D, respectively. Framebuffer 1311C is illustrated as a hash square, where each little hash square may be referred to by secondary control bits. Each hash square represents a block of memory in the framebuffer and in one embodiment could represent a cache line or multiple cache lines in another embodiment.

In one implementation, three control bits (e.g., labeled and referenced as A, B, and C) are illustrated as corresponding to regions 1313, 1315, and 1317. When the framebuffer is cleared, instead of clearing the framebuffer, the control bits are set to cleared state. Here, the three control bits, such as A, B, and C, are shown in the cleared (e.g., CLEAR) state corresponding to and reflecting the state of framebuffer 1311A. In one embodiment, value 0 represents CLEAR and accordingly, A=0, B=0, and C=0. The data in the actual framebuffer could be garbage since the clear operation has been skipped and that the buffer being cleared is tracked in associated control bits, such as control bits A, B, and C, etc.

Framebuffer 1311D is shown in a rendered state which corresponds to framebuffer 1311B and accordingly, regions 1315 and 1317 are shown as being rendered and occupied and their corresponding control bits, such as B and C, are shown as having a value of 1. In one embodiment, value 1 represents a DATA state, which indicates that valid data has been written to the cache lines. Accordingly, control bit B=1 and control bit C=1, while control bit A continues to have a value of 0, which represents a CLEAR state. A is indicated as CLEAR because A has not been written after the clear operation was performed in 1311C. Stated differently, while control bits B and C represent the rendered parts, such as 1315 and 1317, representing valid data, while control bit A continues to represent the background part, such as 1313, which should be in clear state. It is to be noted that in some implementations without the clear color optimization, the control bits representing region 1317 is set to DATA even if the color written to region 1317 is exactly the same as the clear color. In such implementations, any data written to the frame buffer between clears is flagged as DATA, even if the data that is written is identical to the clear color. Accordingly, the cache lines represented by control bits C are read from memory, even though the region contains clear color data. Thus, memory bandwidth may be incurred both during the write of portion 1317, and during the read of region 1317 during subsequent rendering operations or by the sampler or display engine.

Figure 14:
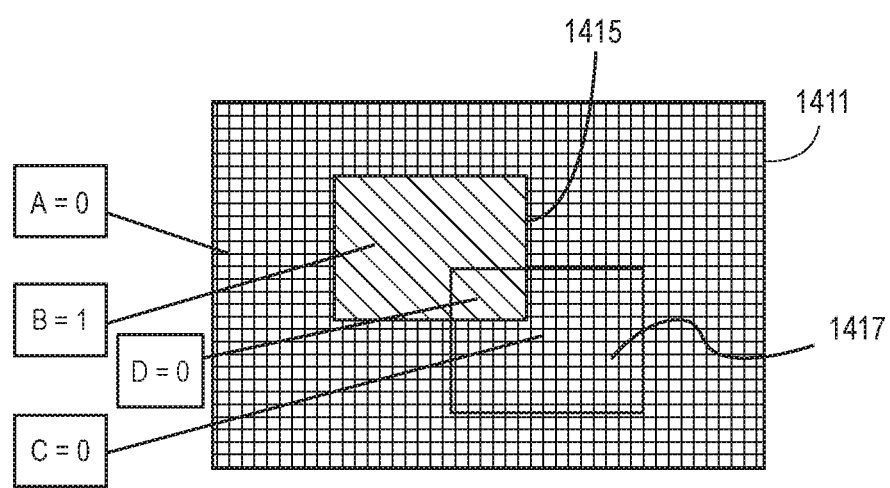
FIG. 14 illustrates an embodiment that provides for the detection of clear color rendering.

FIG. 14 illustrates an embodiment that provides for the detection of clear color rendering. An optimization to render operations to region 1317 of FIG. 13 is shown with respect to render operations to region 1417 of FIG. 14. In one embodiment, the render operation to region 1417 can be performed in a manner such that memory bandwidth is not incurred during reads from or writes to framebuffer memory when a region of the framebuffer is written using the color defined as the clear color for a scene.

In one embodiment, an exemplary render sequence is as follows. First the framebuffer is cleared and control bits for every cache line are marked as 0, indicating the cache lines are CLEAR and that any reads from those cache lines should be satisfied from the register storing the clear color instead of a read from framebuffer memory. Next, region 1415 of the framebuffer is drawn with a color other than the clear color. Cache lines for region 1415 have control bits B, which are marked as 1 (e.g., DATA), indicating that valid data is stored at region 1415. Additional framebuffer region 1417 is rendered using the color designated as the clear color. However, in various embodiments the GPU is configured to detect a write to the frame buffer using the designated clear color. Instead of writing the clear color data to the frame buffer data, the state of the cache lines associated with region 1417 is changed to CLEAR (e.g., 0), as reflected by control bits C.

In some scenarios there may be areas of the framebuffer such as the region of the framebuffer having cache lines represented by control bits D, which are intersection of region 1415 and region 1417, that have content rendered during the rendering of region 1415, but have been partially overwritten by region 1417. In such scenario, control bits D associated with those cache lines are also marked as CLEAR (e.g., D=0), indicating that the region has the clear color. Accordingly, all framebuffer writes associated with region 1417, including cache lines of region 1417 that overlap region 1415 are skipped. When other agents of the GPU, such as the sample or display engine, reads the surface illustrated in FIG. 14, the cache lines represented by control bits C and control bits D are not fetched from memory. Instead, the cache lines data is substituted from a register storing the configured clear color for the scene.

The GPU can detect a clear color framebuffer write using a variety of mechanisms. In some embodiments, end-to-end framebuffer compression is enabled. In one such embodiment, cache lines can be compressed by computing a base value and delta values for pixel data in the cache. The base value for the compression can be set to the clear color value. Accordingly, when a cache line is completely populated with clear color, the delta values would be zero, enabling the compression logic to detect a framebuffer write using clear color. However, compression hardware logic is not a necessary requirement to implement embodiments of the invention described herein, and other clear color render detection mechanisms may be used.

Optimized clear color rendering as described herein may be applied to several use cases. One embodiment provides for an end-to-end optimization for desktop rendering where the desktop has been "composited". Typically in composited desktops, individual intermediate surfaces are rendered, the rendered surfaces are sampled, and the sampled surfaces are written (e.g., com posited) to the final frame buffer. In one embodiment, a predominant color for a surface can be determined and the clear color can be set to the predominant color. A clear operation can be performed at the request of the compositor and the surface for a desktop window can be rendered. During the render, the graphics hardware can suppress writes to the surface that contain the clear color and instead, set control bits for the regions of the surface having the clear color to CLEAR. Samples from the desktop window surface for regions marked as CLEAR can also be suppressed. When the final framebuffer is composited, the framebuffer can be displayed while suppressing clear color reads from the framebuffer based on the control bits set for the various regions of the framebuffer containing the designated clear color.

For example, a word processing program can display a document using a pre-determined background color (e.g., white) and a pre-determined text color (e.g., black). In one embodiment, the pre-determined background color for the document can be set as the clear color and the graphics system can optimize composition of the word processor desktop window by setting the background color to the clear color, clearing the surface. Writes to the desktop window surface by the word processing program can be suppressed by the graphics system. Instead of writing the clear color to the desktop window surface, the control bits associated with the clear color regions of the surface can be set to CLEAR. As the desktop composition of this word processing program window is performed with other windows, samples from the surface for data having the background color can be suppressed and that data can instead be serviced from an internal register of the graphics system that stores the designated clear color, which has been set to the background color of the document. In one embodiment, the display controller can check the control bits for the composited framebuffer. In one embodiment, regions of the composited framebuffer that have control bits marked as clear can be displayed by the display controller from the internal register without reading the data from framebuffer memory, resulting in an additional reduction in memory bandwidth consumed during a display operation.

In one embodiment, stencil buffer operations can be optimized in a similar manner. For example, there are several use cases in common rendering algorithms in which a stencil mask is created to render an object and then the stencil mask is cleared during the final phase of rendering the object. The mask clearing is typically done as part of the rendering operation instead of a separate clear. In one embodiment, as the stencil mask is cleared again, the lines of the stencil buffer can switch back to a "CLEAR" state, which can result in bandwidth savings during the final render phase and rendering of subsequent objects.

Figure 15A:
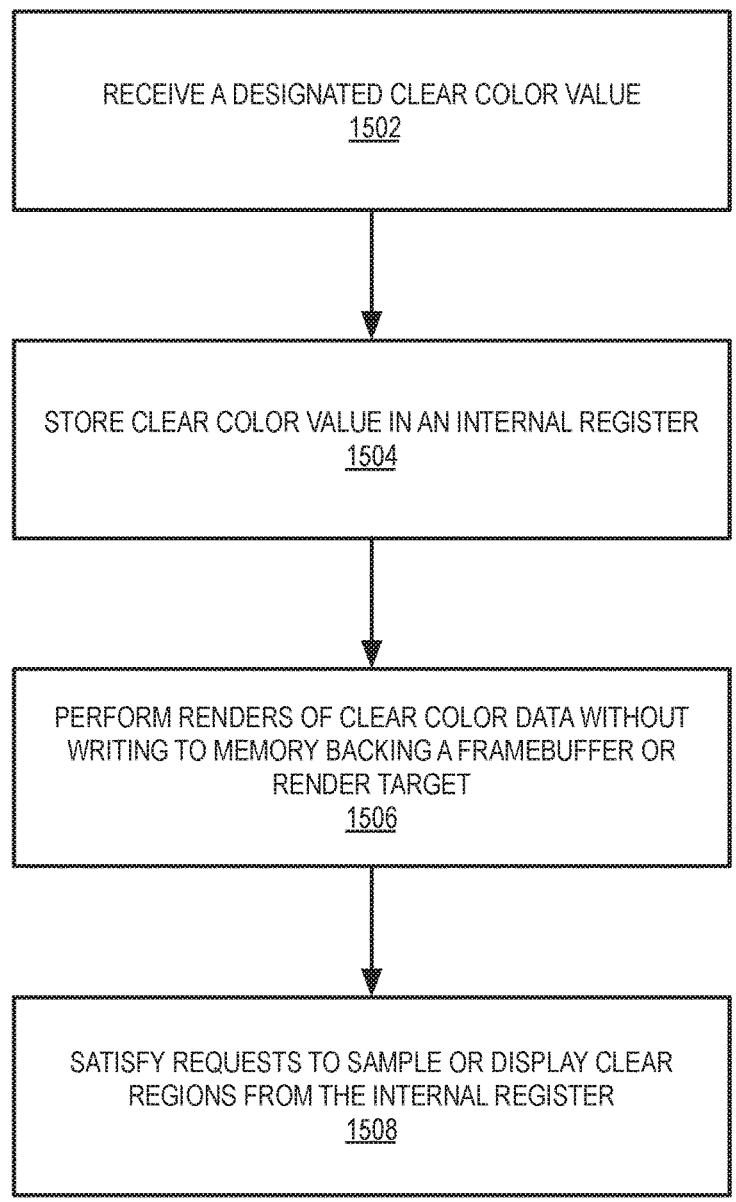
FIG. 15A-C illustrates flow diagrams for logic to perform optimized clear color rendering, according to an embodiment.
Figure 15B:
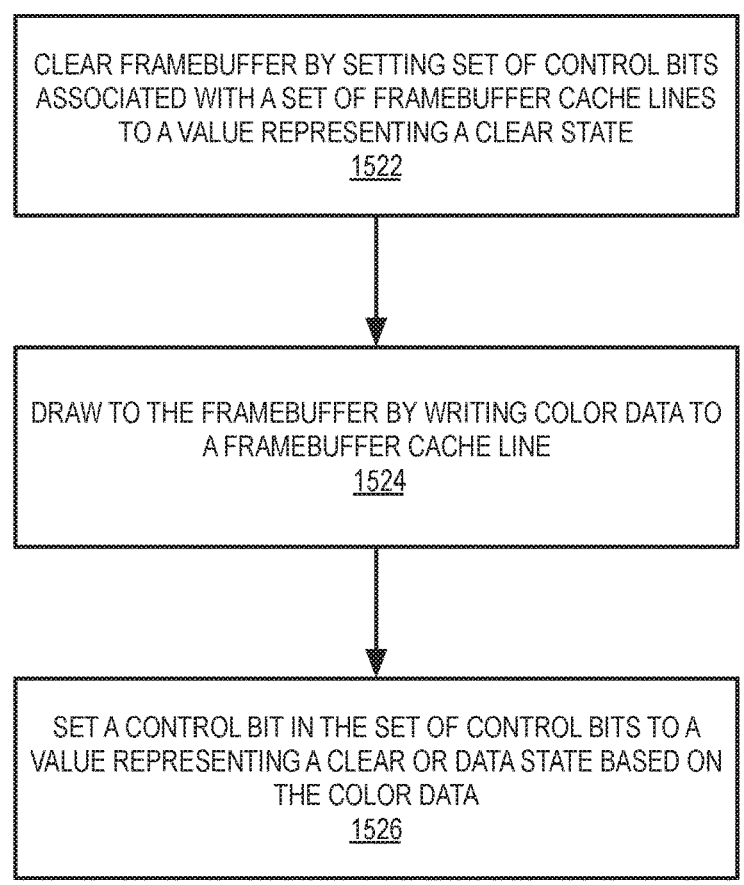
Figure 15C:
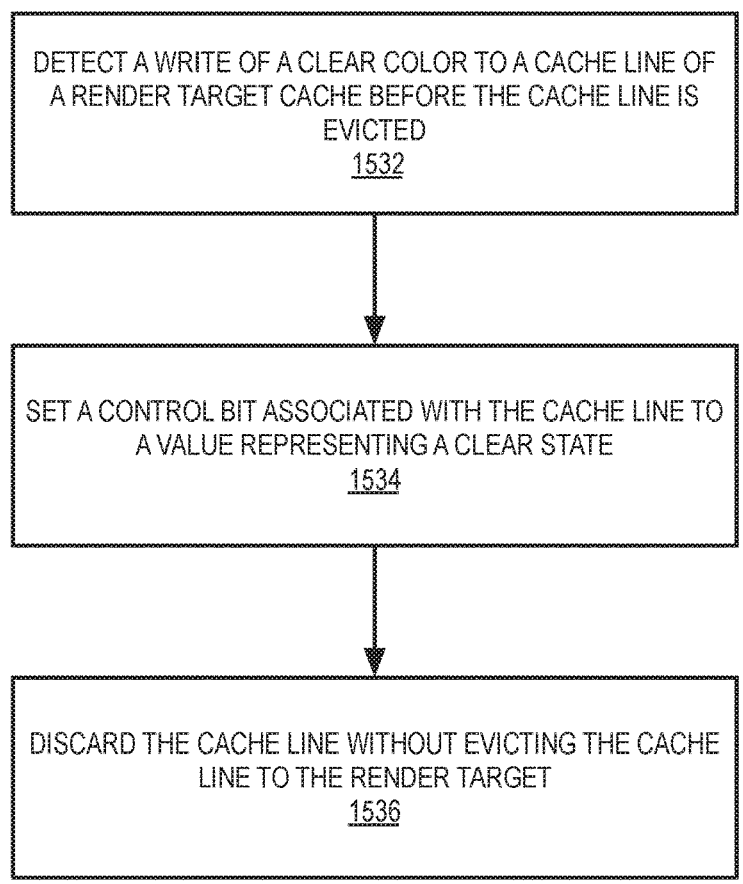

FIG. 15A-C illustrates flow diagrams of logic to perform optimized clear color rendering, according to an embodiment. FIG. 15A is a flow diagram of logic 1500 to configure clear color rendering. FIG. 15B is a flow diagram of logic 1520 to perform optimized clear color rendering. FIG. 15C is a flow diagram of logic 1530 to detect clear color rendering.

FIG. 15A shows logic 1500 to configure clear color rendering which, in one embodiment, is provided by graphics driver software logic, as further detailed in regards to FIG. 18 below. The logic 1500 can configure a graphics processor to perform operations to receive a designated clear color value, as shown at block 1502. In such embodiment, the graphics driver can configure graphics hardware logic to store the clear color value in an internal register of the graphics processor, as shown at block 1504. The clear color may be designated using an API command provided by one of several graphics APIs, such as the glClearColor command of OpenGL.

In one embodiment, the logic 1500 can configure the graphics processor to perform renders of clear color data without writing to memory backing a framebuffer or render target, as shown at block 1506. The clear color renders can be performed using the control bits described above. Writes of clear color data to cache lines associated with a frame buffer or render target can set control bits associated with the region of the frame buffer or render target to which the clear color data is to be written. Writes to the system or graphics processor memory can then be avoided for clear color data.

In one embodiment, an end-to-end solution is provided in which graphics processor sampler logic and display controller logic can read control bits associated with a rendered scene. In such embodiment, as shown at block 1508, the logic 1500 can configure the graphics processor to satisfy requests to sample or display clear regions of a scene from the internal register storing the clear color value.

FIG. 15B is a flow diagram of logic 1520 to perform optimized clear color rendering. In one embodiment, the logic 1520 is included in graphics processing logic of graphics processing hardware and causes the graphics processing hardware to perform framebuffer clear operations by setting a set of control bits associated with a set of cache lines associated with the framebuffer to a value representing a clear state, as shown at block 1522. As shown at block 1524, the logic 1520 can cause the graphics processor to draw to the framebuffer by writing color data to a cache line associated with the framebuffer. The color data written at block 1524 can have the clear color value or a value other than the clear color. As shown at block 1526, the logic 1520 can set a control bit in the set of control bits to a value representing a value representing a clear state or data state based on the color data (e.g., whether the color value is equal to the designated clear color for the scene).

FIG. 15C is a flow diagram of logic 1530 to detect clear color rendering. In one embodiment, the logic 1530 causes the graphics processor to perform operations to detect a write of a clear color to a cache line of a render target (e.g., texture, framebuffer) before the cache line is evicted, as shown at block 1532. The logic 1530 can detect a cached write of the clear color using one of several techniques.

In one embodiment, the logic 1530 utilizes compression logic that compresses rendered data before render target or framebuffer compression. In such embodiment, the compression logic can detect color data values equal to the clear color while the data is in a pre-compressed state. For example and in one embodiment, the compression logic can be configured to automatically compress data in a cache line of a render cache before the compressed data is written to the render target. During compression, the compression logic can be configured to detect cache writes of clear color data. In one such embodiment, cache lines can be compressed by computing a base value and delta values for pixel data in the cache. The base value for the compression can be set to the clear color value. Accordingly, when a cache line is completely populated with clear color, the delta values would be zero, enabling the compression logic to detect cached writes of clear color to the framebuffer. In one embodiment, a set of control bits can be associated with one or more cache lines for a render cache, and each of the cache lines of the render cache can be associated with a region of the render target. At block 1534, the logic 1530 can set a control bit associated with the cache line to a value representing the clear state, based on the detected write of the clear color to the cache line at block 1532. For cache lines completely populated with the clear color, the logic 1530 can discard the cache line without evicting the cache line to the render target, as shown at block 1536.

Figure 16:
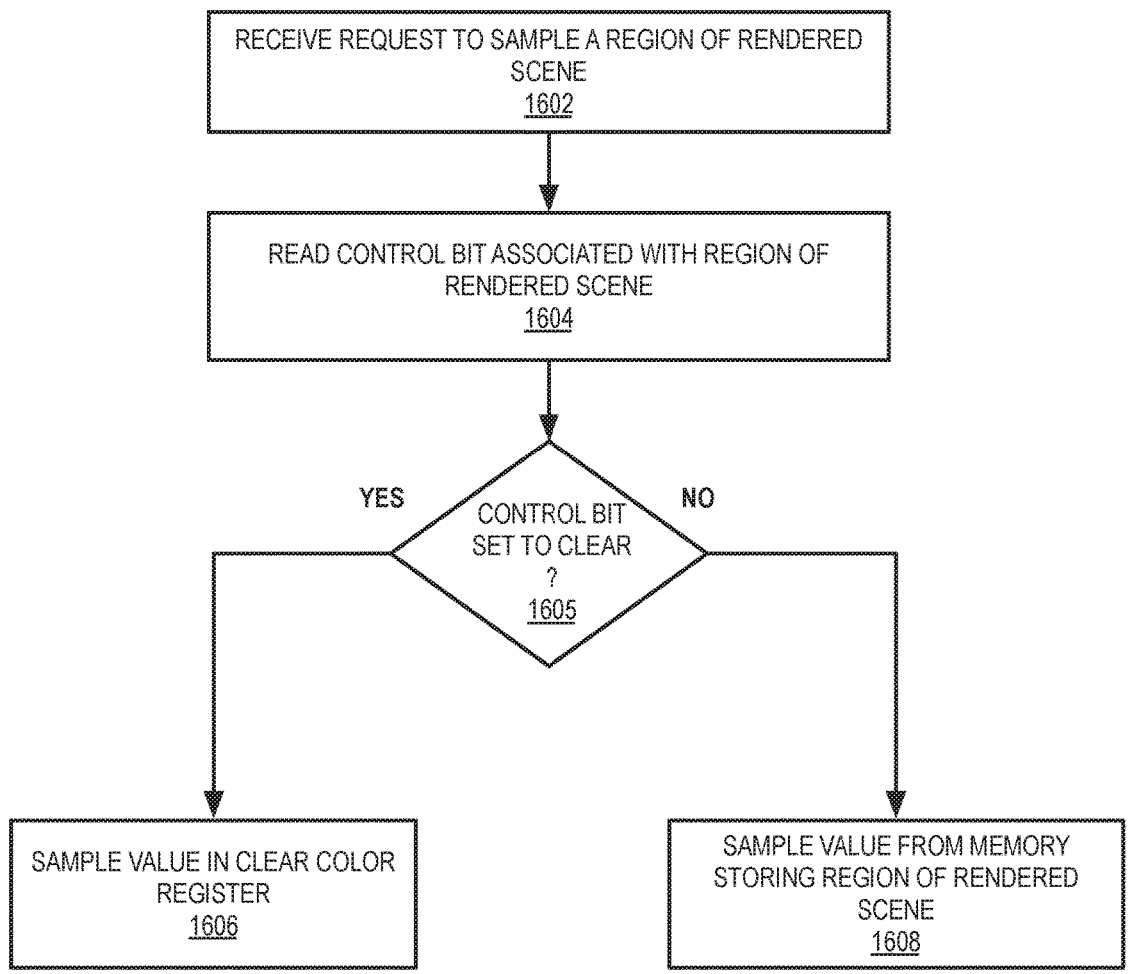
FIG. 16 is a flow diagram of optimized clear color sampling logic, according to an embodiment.

FIG. 16 is a flow diagram of optimized clear color sampling logic 1600, according to an embodiment. In one embodiment, the clear color sampling logic 1600 is performed at least in part by a sampler engine, such as the sampler 610 of FIG. 6, or sampler 1854 of FIG. 18 below. The logic 1600 can configure the graphics processor to receive a request to sample a region of a rendered scene, as shown at block 1602. In response, the graphics processor, as shown at block 1604, can configure the sampler engine to read a control bit associated with the region of the rendered scene. Based on the value of the control bit, as determined at block 1605, the sampler can sample a value in the clear color register as shown at block 1606. If the control bit is not set to clear at block 1605, the sampler can sample the value from the memory storing the region of the rendered the scene, as shown at block 1608.

While the logic 1600 illustrated is for a sampler engine, similar logic can be used for a display controller of the graphics processor. For example, in response to a request to display a region of a rendered scene, the display controller can read the control bit associated with the region of the rendered scene and either display the value in the clear color register or display the value from the memory storing the region of the rendered scene. In each instance, rendered data matching the clear color can be serviced via a register that has clear color data instead of fetching the data from memory.

Figure 17:
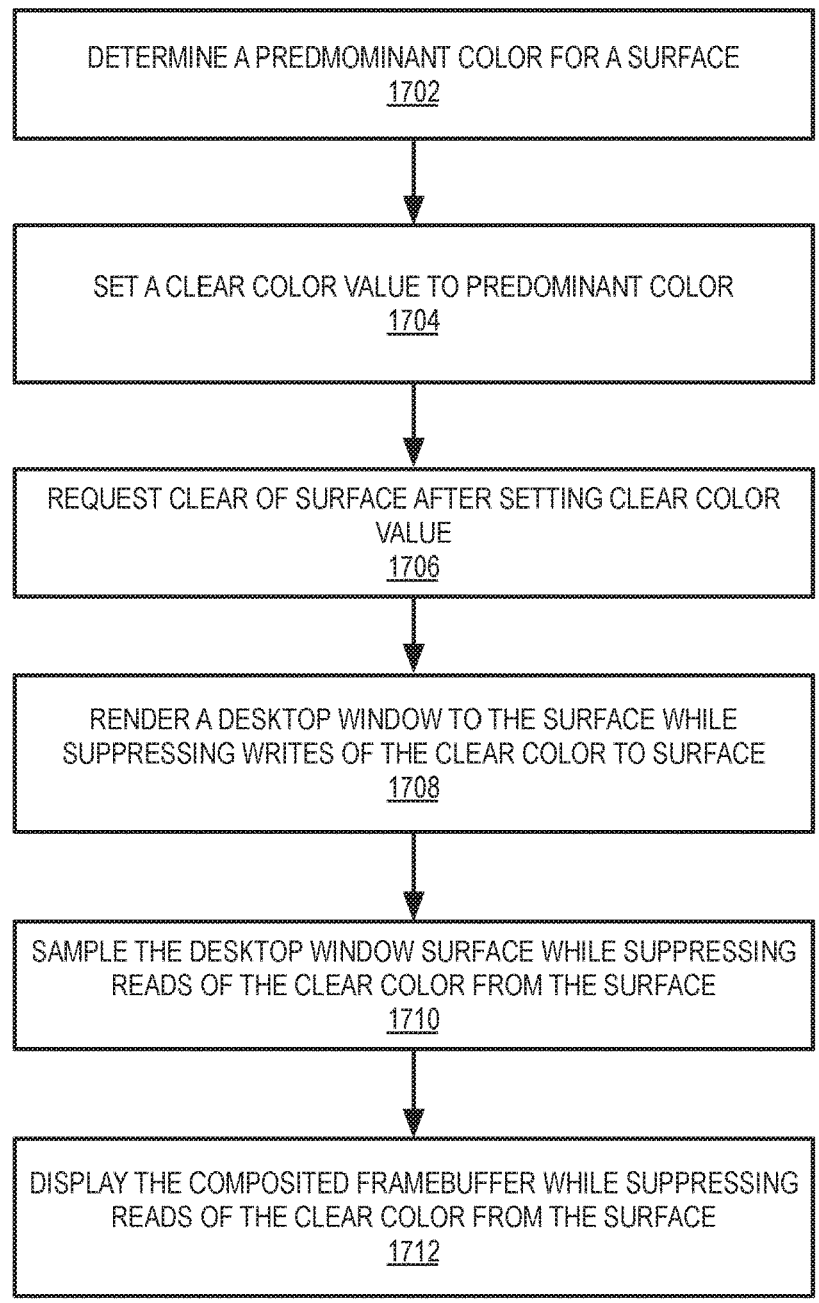
FIG. 17 is a flow diagram of logic to optimize clear color rendering for desktop composition, according to an embodiment.

FIG. 17 is a flow diagram of logic 1700 to optimize clear color rendering for desktop composition, according to an embodiment. In one embodiment, the logic 1700 can utilize the clear color rendering techniques described herein to improve composition performance for desktop composition environments. In such embodiment, the logic 1700 can perform operations including determining a predominant color for a surface, as shown at block 1702. Subsequently, the logic can set a clear color value to the predominant color, as shown at block 1704. The logic 1700 can then request a clear of the surface after setting the clear color value, as shown at block 1706. The logic 1700 can then render a desktop window to the surface while suppressing writes of the clear color to the surface, as shown at block 1708. As shown at block 1710, the logic 1700 can sample the desktop window surface using a sampler engine of the graphics processor. The sampler engine of the graphics processor can be configured to suppress reads of the clear color from the surface. Instead, based on the control bits, the sampler can read the clear color stored in an internal clear color register. As shown at block 1712, the logic 1700 can display the composted framebuffer while suppressing reads of the clear color from the surface based on the control bits configured for the various regions of the framebuffer.

Figure 18:
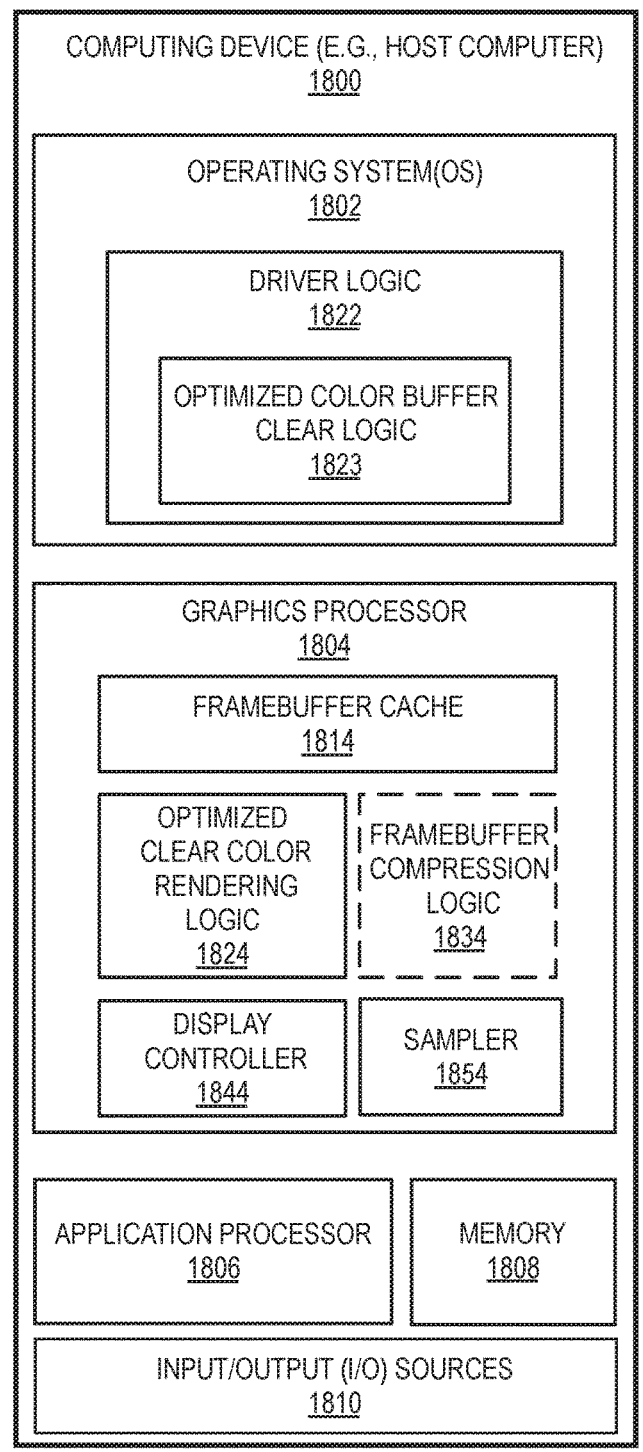
FIG. 18 is a block diagram of a computing device configured to perform optimized clear color rendering, according to an embodiment.

FIG. 18 is a block diagram of a computing device 1800 configured to perform optimized clear color rendering, according to an embodiment. Computing device 1800 (e.g., mobile computing device, desktop computer, etc.) may be the same as data processing system 100 of FIG. 1 and accordingly, for brevity and ease of understanding, many of the details stated above with reference to FIG. 1-10 are not further discussed or repeated hereafter.

Computing device 1800 may include a mobile computing device (e.g., smartphone, tablet computer, laptops, game consoles, portable workstations, etc.) serving as a host machine for a graphics processor 1804 having optimized clear color rendering logic 1824. The computing device 1800 may include any number and type of communication devices, such as large computing systems, such as server computers, desktop computers, etc., and may further include set-top boxes (e.g., Internet-based cable television set-top boxes, etc.), global positioning system (GPS)-based devices, etc. The computing device 1800 may include mobile computing devices serving as communication devices, such as cellular phones including smartphones, personal digital assistants (PDAs), tablet computers, laptop computers, e-readers, smart televisions, television platforms, wearable devices (e.g., glasses, watches, bracelets, smartcards, jewelry, clothing items, etc.), media players, etc. For example, in one embodiment, the computing device 1800 includes a mobile computing device employing an integrated circuit ("IC"), such as system on a chip ("SoC" or "SOC"), integrating various hardware and/or software components of computing device 1800 on a single chip.

In one embodiment, the graphics processor 1804 includes a framebuffer cache 1814 to cache framebuffer data. The framebuffer cache may be used by the optimized clear color rendering logic 1824 to detect writes of clear color data before the cached data is evicted to the framebuffer, which in one embodiment is stored in a pre-allocated buffer in memory 1808. In one embodiment, the clear color writes are detected using framebuffer compression logic 1834, although framebuffer compression logic 1834 is not required for all embodiments. In one embodiment, the graphics processor 1804 includes a display controller 1844 and a sampler 1854, each configured to sample from and display framebuffer or other render target memory that is the target of the optimized clear color rendering logic 1824, to provide optimized clear color sampling and display capabilities as described herein in accordance with the various embodiments. In one embodiment, the display controller 1844 is a variant of the display controller 302 of FIG. 3 and/or the display engine 840 of FIG. 4. The sampler 1854, in one embodiment, is a variant of the sampler 854 of FIG. 8.

As illustrated, in one embodiment, in addition to a graphics processor 1804 employing optimized clear color rendering logic 1824, the computing device 1800 may further include any number and type of hardware components and/or software components, such as (but not limited to) an application processor 1806, memory 1808, and input/output (I/O) sources 1810. The application processor 1806 can interact with a hardware graphics pipeline, as illustrated with reference to FIG. 3, to share graphics pipelining functionality. Processed data is stored in a buffer in the hardware graphics pipeline, and state information is stored in memory 1808. The resulting image is then transferred to a display component or device, such as display device 320 of FIG. 3, for displaying. It is contemplated that the display device may be of various types, such as Cathode Ray Tube (CRT), Thin Film Transistor (TFT), Liquid Crystal Display (LCD), Organic Light Emitting Diode (OLED) array, etc., to display information to a user.

The application processor 1806 can include one or processors, such as processor(s) 102 of FIG. 1, and may be the central processing unit (CPU) that is used at least in part to execute an operating system (OS) 1802 for the computing device 1802. The OS 1802 can serve as an interface between hardware and/or physical resources of the computer device 1800 and a user. The OS 1802 can include driver logic 1822 including the user mode graphics driver 1026 and/or kernel mode graphics driver 1029 of FIG. 10. The driver logic 1822 can additional optimized color buffer clear logic 1823 to configure operations utilizing the optimized clear color rendering logic 1824 of the graphics processor 1804. It is contemplated that in some embodiments, the graphics processor 1804 may exist as part of the application processor 1806 (such as part of a physical CPU package) in which case, at least a portion of the memory 1808 may be shared by the application processor 1806 and graphics processor 1804, although at least a portion of the memory 1808 may be exclusive to the graphics processor 1804, or the graphics processor 1804 may have a separate store of memory.

The memory 1808 may comprise a pre-allocated region of a buffer (e.g., framebuffer); however, it should be understood by one of ordinary skill in the art that the embodiments are not so limited, and that any memory accessible to the lower graphics pipeline may be used. The memory 1808 may include various forms of random access memory (RAM) (e.g., SDRAM, SRAM, etc.) comprising an application that makes use of the graphics processor 1804 to render a desktop or 3D graphics scene. A memory controller hub, such as memory controller hub 116 of FIG. 1, may access data in the RAM and forward it to graphics processor 1804 for graphics pipeline processing. The memory 1808 may be made available to other components within the computing device 1800. For example, any data (e.g., input graphics data) received from various I/O sources 1810 of the computing device 1800 can be temporarily queued into memory 1808 prior to their being operated upon by one or more processor(s) (e.g., application processor 1806) in the implementation of a software program or application. Similarly, data that a software program determines should be sent from the computing device 1800 to an outside entity through one of the computing system interfaces, or stored into an internal storage element, is often temporarily queued in memory 1808 prior to its being transmitted or stored.

The I/O sources can include devices such as touchscreens, touch panels, touch pads, virtual or regular keyboards, virtual or regular mice, ports, connectors, network devices, or the like, and can attach via an input/output (I/O) control hub (ICH) 130 as referenced in FIG. 1. Additionally, the I/O sources 1810 may include one or more I/O devices that are implemented for transferring data to and/or from the computing device 1800 (e.g., a networking adapter); or, for a large-scale non-volatile storage within the computing device 1800 (e.g., hard disk drive). User input devices, including alphanumeric and other keys, may be used to communicate information and command selections to graphics processor 1804. Another type of user input device is cursor control, such as a mouse, a trackball, a touchscreen, a touchpad, or cursor direction keys to communicate direction information and command selections to GPU 1814 and to control cursor movement on the display device. Camera and microphone arrays of the computer device 1800 may be employed to observe gestures, record audio and video and to receive and transmit visual and audio commands.

I/O sources 1810 configured as network interfaces can provide access to a network, such as a LAN, a wide area network (WAN), a metropolitan area network (MAN), a personal area network (PAN), Bluetooth, a cloud network, a cellular or mobile network (e.g., $3^{rd}$ Generation (3G), $4^{th}$ Generation (4G), etc.), an intranet, the Internet, etc. Network interface(s) may include, for example, a wireless network interface having one or more antenna(e). Network interface(s) may also include, for example, a wired network interface to communicate with remote devices via network cable, which may be, for example, an Ethernet cable, a coaxial cable, a fiber optic cable, a serial cable, or a parallel cable.

Network interface(s) may provide access to a LAN, for example, by conforming to IEEE 802.11 standards, and/or the wireless network interface may provide access to a personal area network, for example, by conforming to Bluetooth standards. Other wireless network interfaces and/or protocols, including previous and subsequent versions of the standards, may also be supported. In addition to, or instead of, communication via the wireless LAN standards, network interface(s) may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

It is to be appreciated that a lesser or more equipped system than the example described above may be preferred for certain implementations. Therefore, the configuration of the computing device 1800 may vary from implementation to implementation depending upon numerous factors, such as price constraints, performance requirements, technological improvements, or other circumstances. Examples include (without limitation) a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Embodiments may be implemented as any one or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of. one or more data signals embodied in and/or modulated by a carrier wave or other propagation medium via a communication link (e.g., a modem and/or network connection).

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. A graphics processing system comprising:
   a register storing a clear color value;
   a frame buffer comprising a plurality of cache lines, each cache line storing a plurality of color values for pixels in a block of the frame buffer;
   a set of control bits, each control bit representing one or more states of one or more cache lines; and
   a processor coupled to the register, frame buffer and set of control bits and configured to
   clear one or more cache lines of the frame buffer by setting each control bit representing states of the one or more cache lines to a clear state, and
   read the clear color value from the register for any read requests to the one or more cache lines represented by a control bit in the clear state.

2. The graphics processing system of claim 1, wherein each control bit represents states further including a data state of the one or more cache lines.

3. The graphics processing system of claim 2, wherein the processor is further configured to render one or more blocks of the frame buffer with a color other than the clear color and to set each control bit representing the one or more cache lines of the one or more blocks of the frame buffer to the data state.

4. The graphics processing system of claim 1, wherein the processor is configured to detect a write request of the clear color to one or more cache lines of the frame buffer and to set each control bit representing a state of the one or more cache lines to the clear state if the write request of the clear color is detected.

5. The graphics processing system of claim 4, wherein the write request of the clear color value to the one or more cache lines of the frame buffer is skipped.

6. The graphics system of claim 4, wherein each control bit represents states further including a compressed state of the one or more cache lines.

7. The graphics system of claim 6, wherein the processor is configured to detect the write request of the clear color value to one or more cache lines in the compressed state.

8. A non-transitory machine-readable medium storing instructions which, when executed by one or more processors, causes the one or more processors to perform an operation comprising:
storing a clear color value in a register;
clearing one or more cache lines of a frame buffer by setting each control bit in a set of control bits representing one or more states of the one or more cache lines in a clear state, wherein each cache line stores a plurality of color values for pixels in a block of the frame buffer; and
reading the clear color value from the register for any read requests to the one or more cache lines represented by a control bit in the clear state.

9. The non-transitory machine-readable medium of claim 8, wherein the one or more processors perform an operation comprising:
rendering one or more blocks of the frame buffer with a color other than the clear color value; and
setting each control bit representing the one or more cache lines of the one or more blocks of the frame buffer to the data state.

10. The non-transitory machine-readable medium of claim 9, wherein the one or more processors perform an operation comprising:
detecting a write request of the clear color to one or more cache lines of the frame buffer; and
setting each control bit representing a state of the one or more cache lines to the clear state if the write request of the clear color is detected.

11. The non-transitory machine-readable medium of claim 10, wherein the one or more processors perform an operation comprising:
skipping the write request of the clear color to the one or more cache lines of the frame buffer.

12. The non-transitory machine-readable medium of claim 11, wherein the one or more processors perform an operation comprising:
setting one or more control bits to a compressed state for one or more cache lines.

13. The non-transitory machine-readable medium of claim 12, wherein the one or more processors perform an operation comprising:
detecting the write request of the clear color value to one or more cache lines in the compressed state.

14. A graphics processor comprising:
a register storing a clear color value;
a frame buffer comprising a plurality of blocks of memory, each block of memory storing a plurality of color values for pixels in the block;
a set of control bits, each control bit representing one or more states of one or more blocks of memory; and
render logic coupled to the register, frame buffer and set of control bits and configured to
clear blocks of memory of the frame buffer by setting each control bit representing states of the one or more blocks of memory to a clear state, and
read the clear color value from the register for any read requests to the one or more blocks of memory represented by a control bit in the clear state.

15. The graphics processor of claim 14, wherein each control bit represents states further including a data state of the one or more blocks of memory.

16. The graphics processor of claim 15, wherein the render logic is further configured to render one or more blocks of memory of the frame buffer with a color other than the clear color value and to set each control bit representing the one or more blocks of memory to the data state.

17. The graphics processor claim 14, wherein the render logic is further configured to detect a write request of the clear color value to one or more blocks of memory and to set each control bit representing a state of the one or more blocks to the clear state if the write request of the clear color is detected.

18. The graphics processor of claim 17, wherein the render logic is further configured to skip the write request of the clear color value to the one or more blocks of memory.

19. The graphics processor of claim 17, further comprising:
compression logic to compress color values of the one or more blocks of memory.

20. The graphics processor of claim 19, wherein the render logic is further configured to detect the write request of the clear color to one or blocks of memory based on the compressed color values.

* * * * *